United States Patent
Pemmaraju

(10) Patent No.: US 8,713,701 B2
(45) Date of Patent: *Apr. 29, 2014

(54) MULTICHANNEL DEVICE UTILIZING A CENTRALIZED OUT-OF-BAND AUTHENTICATION SYSTEM (COBAS)

(71) Applicant: StrikeForce Technologies, Inc., Edison, NJ (US)

(72) Inventor: Ram Pemmaraju, Old Bridge, NJ (US)

(73) Assignee: StrikeForce Technologies, Inc., Edison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/840,757

(22) Filed: Mar. 15, 2013

(65) Prior Publication Data

US 2013/0227665 A1 Aug. 29, 2013

Related U.S. Application Data

(63) Continuation of application No. 12/958,126, filed on Dec. 1, 2010, now Pat. No. 8,484,698, which is a continuation of application No. 10/970,559, filed on Oct. 21, 2004, now Pat. No. 7,870,599, which is a continuation-in-part of application No. 09/655,297, filed on Sep. 5, 2000, now abandoned.

(51) Int. Cl.
G06F 21/42 (2013.01)
(52) U.S. Cl.
USPC ..................................... 726/27; 726/2; 726/5
(58) Field of Classification Search
None
See application file for complete search history.

(56) References Cited

U.S. PATENT DOCUMENTS

| | | | | |
|---|---|---|---|---|
| 4,876,717 A * | 10/1989 | Barron et al. | ...................... | 726/5 |
| 5,148,479 A * | 9/1992 | Bird et al. | ...................... | 713/155 |
| 5,153,918 A * | 10/1992 | Tuai | .............................. | 713/182 |
| 5,280,581 A * | 1/1994 | Bathrick et al. | .............. | 709/217 |
| 5,311,596 A * | 5/1994 | Scott et al. | ...................... | 380/33 |
| 5,548,646 A | 8/1996 | Aziz et al. | | |
| 5,588,060 A | 12/1996 | Aziz | | |
| 5,615,277 A | 3/1997 | Hoffman | | |
| 5,621,809 A | 4/1997 | Bellegarda et al. | | |
| 5,680,458 A | 10/1997 | Spelman et al. | | |
| 5,787,187 A | 7/1998 | Bouchard et al. | | |
| 5,826,014 A | 10/1998 | Coley et al. | | |
| 5,872,834 A | 2/1999 | Teitelbaum | | |
| 5,881,234 A * | 3/1999 | Schwob | ........................ | 709/219 |
| 5,898,830 A | 4/1999 | Wesinger, Jr. et al. | | |
| 5,901,284 A | 5/1999 | Hamdy-Swink | | |
| 5,915,001 A * | 6/1999 | Uppaluru | .................. | 379/88.22 |
| 6,012,144 A * | 1/2000 | Pickett | ............................ | 726/26 |
| 6,016,476 A * | 1/2000 | Maes et al. | ...................... | 705/18 |
| 6,088,431 A | 7/2000 | LaDue | | |

(Continued)

*Primary Examiner* — William Powers
(74) *Attorney, Agent, or Firm* — Blank Rome LLP

(57) ABSTRACT

A multichannel security system is disclosed, which system is for granting and denying access to a host computer in response to a demand from an access-seeking individual and computer. The access-seeker has a peripheral device operative within an authentication channel to communicate with the security system. The access-seeker initially presents identification and password data over an access channel which is intercepted and transmitted to the security computer. The security computer then communicates with the access-seeker. A biometric analyzer—a voice or fingerprint recognition device—operates upon instructions from the authentication program to analyze the monitored parameter of the individual. In the security computer, a comparator matches the biometric sample with stored data, and, upon obtaining a match, provides authentication. The security computer instructs the host computer to grant access and communicates the same to the access-seeker, whereupon access is initiated over the access channel.

20 Claims, 18 Drawing Sheets

(56) References Cited

U.S. PATENT DOCUMENTS

| | | |
|---|---|---|
| 6,088,683 A | 7/2000 | Jalili |
| 6,219,793 B1 | 4/2001 | Li et al. |
| 6,249,865 B1 * | 6/2001 | Walker et al. ............. 713/155 |
| 6,408,062 B1 | 6/2002 | Cave |
| 6,928,547 B2 * | 8/2005 | Brown et al. ............. 713/186 |
| 6,934,858 B2 * | 8/2005 | Woodhill ............. 726/5 |
| 6,993,658 B1 | 1/2006 | Engberg et al. |
| 2004/0030935 A1 | 2/2004 | Kai |

\* cited by examiner

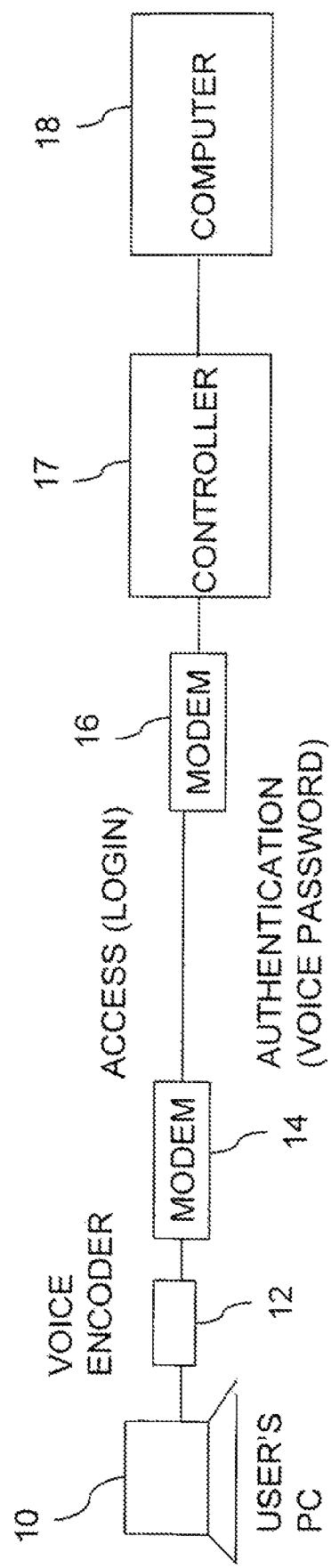

MULTICHANNEL DEVICE UTILIZING A CENTRALIZED OUT-OF-BAND AUTHENTICATION SYSTEM (COBAS)

RELATED APPLICATION

This application is a continuation of an application entitled MULTICHANNEL DEVICE UTILIZING A CENTRALIZED OUT-OF-BAND AUTHENTICATION SYSTEM (COBAS), Ser. No. 12/958,126, which is a continuation of an application entitled MULTICHANNEL DEVICE UTILIZING A CENTRALIZED OUT-OF-BAND AUTHENTICATION SYSTEM (COBAS), Ser. No. 10/970,559 which issued as U.S. Pat. No. 7,870,599, which is a continuation-in-part of an application entitled OUT-OF-BAND SECURITY NETWORKS FOR COMPUTER NETWORK APPLICATIONS, Ser. No. 09/655,297, filed Sep. 5, 2000, now abandoned, the contents of which are incorporated herein by reference.

BACKGROUND OF THE INVENTION

1. Field of the Invention

This invention relates to security networks for computer network applications, and, more particularly, to a security network which provides user authentication by an out-of-band system that is entirely outside the host computer network being accessed. In addition, the out-of-band system optionally includes provision for biometric identification as part of the authentication process.

2. Background of the Invention

In the past, there have typically been three categories of computer security systems, namely, access control, encryption and message authentication, and intrusion detection. The access control systems act as the first line of defense against unwanted intrusions, and serve to prevent hackers who do not have the requisite information, e.g. the password, etc., from accessing the computer networks and systems. Secondly, the encryption and message authentication systems ensure that any information that is stored or in transit is not readable and cannot be modified. In the event that a hacker is able to break into the computer network, these systems prevent the information from being understood, and, as such, encryption systems as the second line of defense. Further intrusion detection systems uncover patterns of hacker attacks and viruses and, when discovered provide an alarm to the system administrator so that appropriate action can be taken. Since detection systems operate only after a hacker has successfully penetrated a system, such systems act as a third line of defense.

Obviously, as an access control system is the first line of defense, it is important that the selection thereof be well-suited to the application. In access control systems there is a broad dichotomy between user authentication and host authentication systems. In current practice, the most common user authentication systems include simple password systems, random password systems, and biometric systems. The simple password systems are ubiquitous in our society with every credit card transaction using a pin identification number, every automatic teller machine inquiry looking toward a password for access, and even telephone answering messages using simple password systems for control.

Additionally, when random password systems are used, another level of sophistication is added. In these systems, the password changes randomly every time a system is access. These systems are based on encryption or a password that changes randomly in a manner that is synchronized with an authorization server. The Secure ID card is an example of such a system. Random password systems require complimentary software and/or hardware at each computer authorized to use the network.

In biometric systems, characteristics of the human body, such as voice, fingerprints or retinal scan, are used to control access. These systems require software and/or hardware at each computer to provide authorization for the use of the network.

Another category of access control is that of host authentication. Here the commonest systems are those of "callback" and "firewall" systems. Callback systems are those systems which work by calling a computer back at a predetermined telephone number. These systems authenticate the location of a computer and are suitable for dial-up (modem) networks; however, such systems are ineffective when the attack comes via the Internet. On the other hand, firewall systems are designed to prevent attacks coming from the Internet and work by allowing access only from computers within a network. Even though firewall systems are implemented either as standalone systems or incorporated into routers, skilled hackers are able to penetrate host authentication systems.

Typically, access-control security products, as described above, are in-band authentication systems with the data and the authentication information on the same network. Thus, upon accessing a computer, a computer prompt requests that you enter your password and, upon clearance, access is granted. In this example, all information exchanged is on the same network or in-band. The technical problem created thereby is that the hacker is in a self-authenticating environment.

Except for callback systems, the above access control products authenticate only the user and not the location. When computer networks could only be accessed by modems, the authentication of location by dialing back the access-requesting computer, provided a modicum of security. Now, as virtually all computer networks are accessible by modem-independent internet connection, location authentication by callback is no longer secure. The lack of security arises as there is no necessary connection between the internet address and a location, and, in fact, an internet address most often changes from connection to connection. Thus, callback systems are rendered useless against attacks originating from the internet.

In preparing for this application, a review of various patent resources was conducted. The review resulted in the inventor gaining familiarity with the following patents:

| Item No. | Pat. No. | Inventor | Orig. Class | Date |
|---|---|---|---|---|
| 1 | 6,408,062 | Cave, Ellis K. | 379/210.01 | June 2002 |
| 2 | 5,901,284 | Hamdy-Swink, Katheryn A. | 713/200 | May 1999 |
| 3 | 5,898,830 | Wesinger, Jr., et al. | 395/187.01 | April 1999 |
| 4 | 5,872,834 | Teitelbaum | 379/93.03 | February 1999 |
| 5 | 5,826,014 | Coley, et al. | 718,201 | October 1998 |
| 6 | 5,787,187 | Bouchard | 382/115 | July 1998 |
| 7 | 5,680,458 | Spelman, et al. | 380/21 | October 1997 |
| 8 | 5,621,809 | Bellegarda, et al. | 382/116 | April 1997 |
| 9 | 5,615,277 | Hoffman | 382/115 | March 1997 |
| 10 | 5,588,060 | Aziz | 380/30 | December 1996 |
| 11 | 5,548,646 | Aziz, et al. | 380/23 | August 1996 |
| 12 | 5,153,918 | Tuai, Gregory | 713/182 | October 1992 |

In general terms, the patents all show a portion of the authentication protocol and the data transferred in the same channel or "in-band". For purposes of this discussion "in-band" operation is defined as one conducted wholly within a single channel or loop. Likewise, an "out-of-band" operation is defined as one using an authentication channel that is separated from the channel carrying the information and therefore is nonintrusive as it is carried over separate facilities, frequency channels, or time slots than those used for actual information transfer.

The patent to E. K. Cave, U.S. Pat. No. 6,408,062, Item 1 above, describes a callback system. Here, the user is prequalified so that he does not get charged for calls that are not completed to the called party. However, here the authentication and the administrative function are in the same loop.

In Item 3, the patent to Wesinger et al., U.S. Pat. No. 5,898,830 ('830) is a firewall patent. Here, the inventor attempts to enhance security by using out-of-band authentication. In his approach, a communication channel, or medium, other than the one over which the network communication takes place, is used to transmit or convey an access key. The key is transmitted from a remote location (e.g., using a pager or other transmission device) and, using a hardware token, the key is conveyed to the local device. In the Wesinger '830 system, to gain access, a hacker must have access to a device (e.g., a pager, a token, etc.) Used to receive the out-of-band information. Pager beep-back or similar authentication techniques may be especially advantageous in that, if a hacker attempts unauthorized access to a machine while the authorized user is in possession of the device, the user will be alerted by the device unexpectedly receiving the access key. The key is unique to each transmission, such that even if a hacker is able to obtain it, it cannot be used at other times or places or with respect to any other connection.

Next, turning to Item 7, the patent to Spelman et al., U.S. Pat. No. 5,680,458 ('458), a method of recovering from the compromise of a root key is shown. Here, following the disruption of a new replacement key, an out-of-band channel is used by a central authority to publish a verification code which can be used by customers to verify the authenticity of the emergency message. The Spelman '458 patent further indicates that the central authority uses the root key to generate a digital signature which is appended to the emergency message to verify that the emergency message is legitimate.

Hoffman, U.S. Pat. No. 5,615,277, Item 9, is next discussed. Here, biometrics are combined with a tokenless security and the patent describes a method for preventing unauthorized access to one or more secured computer systems. The security system and method are principally based on a comparison of a unique biometric sample, such as a voice recording, which is gathered directly from the person of an unknown user with an authenticated unique biometric sample of the same type. The Hoffman technology is networked to act as a full or partial intermediary between a secured computer system and its authorized users. The security system and method further contemplate the use of personal codes to confirm identifications determined from biometric comparisons, and the use of one or more variants in the personal identification code for alerting authorities in the event of coerced access.

Items 10 and 11 have a common assignee, Sun Microsystems, Inc., and both concern encryption/decryption keys and key management.

The patent to Tuai, U.S. Pat. No. 5,153,918 ('918) describes an in-band authentication system which uses a callback system after authentication. Within the authentication system, Tuai '918 employs a voice verification technique.

The submission of the above list of documents is not intended as an admission that any such document constitutes prior art against the claims of the present application. Applicant does not waive any right to take any action that would be appropriate to antedate or otherwise remove any listed document as a competent reference against the claims of the present application. None of the above show the novel and unobvious features of the invention described hereinbelow.

SUMMARY

In general terms, the invention disclosed hereby includes in the embodiments thereof, a unique combination of user and host authentication. The security system of the present invention is out-of-band with respect to the host computer and is configured to intercept requests for access. The first step in controlling the incoming access flow is a user authentication provided in response to prompts for a user identification and password. After verification at the security system, the system operating in an out-of-band mode, uses telephone dialup for location authentication and user authentication via a password entered using a telephone keypad. In addition and optionally the system provides further authentication using a biometric system. When voice recognition is employed for the biometric component, the user speaks a given phrase which the system authenticates before permitting access. Upon granting of access, the user now for the first time enters the in-band operating field of the host computer.

OBJECT AND FEATURES OF THE INVENTION

It is an object of the present invention to provide a host computer with a cost effective, out-of-band security network that combines high security and tokenless operation.

It is a further object of the present invention to provide a network to isolate the authentication protocol of a computer system from the access channel therefor.

It is yet another object of the present invention to provide a separate security network which acts conjunctively with or as an overlying sentry box to the existing security system provided by the host computer.

It is still yet another object of the present invention to provide an authentication using a biometric component, such as speech recognition, to limit access to specific individuals.

It is a feature of the present invention that the security network achieves high security without encryption and decryption.

It is another feature of the present invention to have a callback step that restricts authentication to a given instrument thereby enabling restriction to a fixed location.

It is yet another feature of the present invention to combine callback and speech recognition in an out-of-band security facility.

Other objects and features of the invention will become apparent upon review of the drawings and the detailed description which follow.

BRIEF DESCRIPTION OF THE DRAWINGS

In the following drawings, the same parts in the various views are afforded the same reference designators.

FIG. 1 is a schematic diagram of the prior art security system;

DESCRIPTION OF THE PREFERRED EMBODIMENT

Figure 1A:
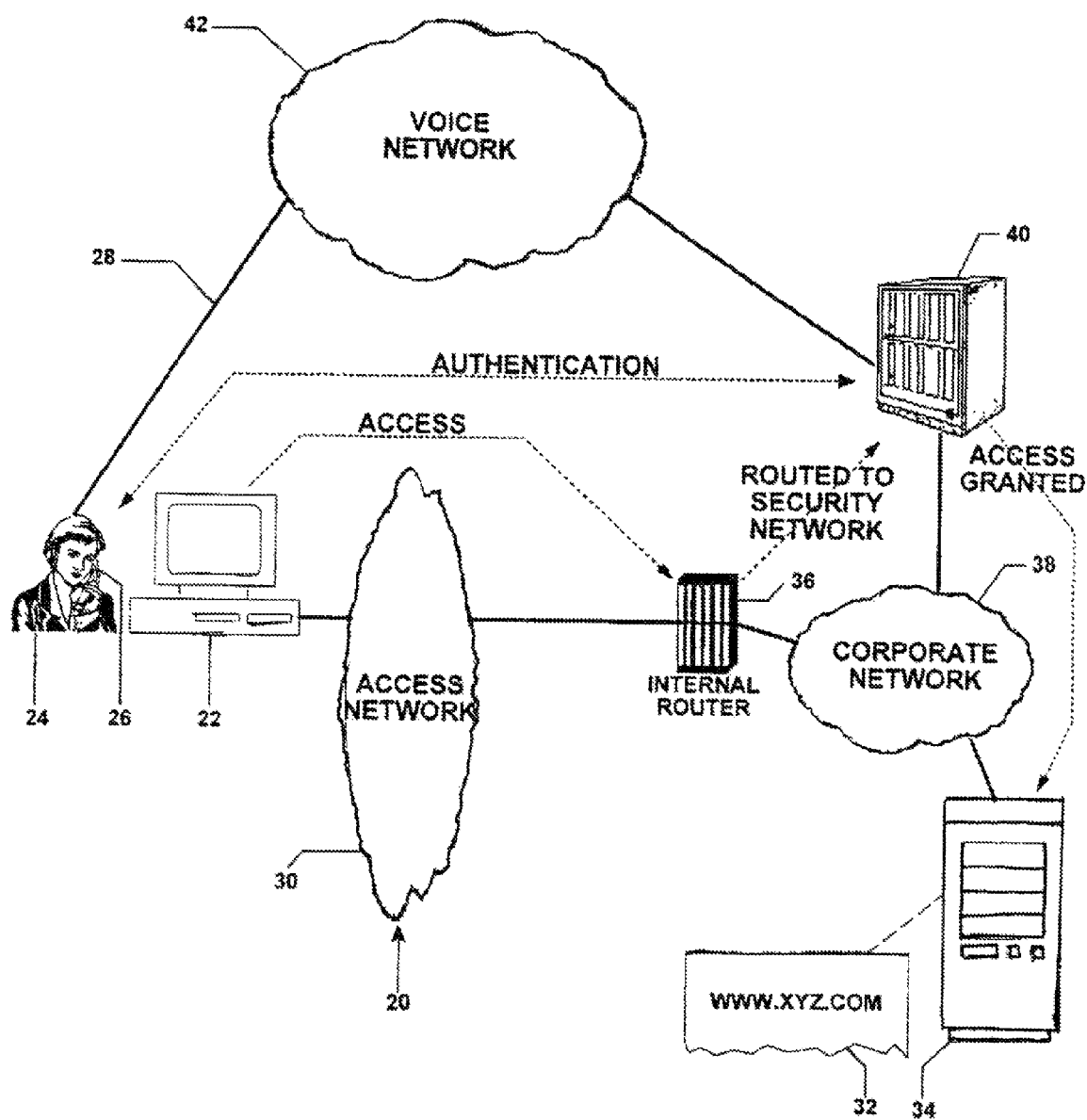
FIG. 1A is a schematic diagram of the security system of the present invention as applied to the internet in which an external accessor in a wide area network seeks entry into a host system.

In the description that follows, the prior art is shown in FIG. 1. In a typical call-back system which this epitomizes, the user from his computer 10 accesses through an optional voice encoder 12 and, along a single authentication channel. The channel includes an in-band arrangement of the user's modem 14, the host computer modem 16 and the authentication controller 17. In a specific example of this, in the Tuai '918 system, see supra, which uses voice verification, the user accesses a host computer 18 via modems 14 and 16. The access attempt is intercepted by the controller 17 which prompts the user to enter a USER ID and speak a phrase for voice verification. If the verification is successful, the controller 17 acting within the single communication channel connects the user computer to the host computer. Both the USER ID and the voice password are sent along the same pathway and any improper accessor into this channel has the opportunity to monitor and/or enter both identifiers.

The out-of-band security system networks for computer network applications is described in two embodiments. The first describes an application to a wide area network, such as the internet, wherein the person desiring access and the equipment used thereby are remote from the host computer. In this description and consistent with Newton's *Telecom Dictionary* (19th Ed.), an "out-of-band" system is defined herein as one having an authentication channel that is separated from the information channel and therefore is nonintrusive as it is carried over separate facilities than those used for actual information transfer. The second embodiment describes the application of the disclosed invention to a local area network wherein the person desiring access and the equipment used thereby are within the same network (referred to as the "corporate network") as the host computer. For purposes of this description the person desiring access and the equipment used thereby are referred collectively as the "accessor".

In FIG. 1, a general overview of the first embodiment of the out-of-band security networks for computer network applications of this invention is shown and is referred to generally by the reference designator 20. Here the accessor is the computer equipment 22, including the central processing unit and the operating system thereof, and the person or user 24 whose voice is transmittable by the telephone 26 over telephone lines 28. The access network 30 is constructed in such a manner that, when user 24 requests access to a web page 32 located at a host computer or web server 34 through computer 22, the request-for-access is diverted by a router 36 internal to the corporate network 38 to an out-of-band security network 40. Authentication occurs in the out-of-band security network 40, which is described in detail below.

This is in contradistinction to present authentication processes as the out-of-band security network 40 is isolated from the corporate network 38 and does not depend thereon for validating data. The first shows a biometric validation which, in this case, is in the form of voice recognition and is within voice network 42. While voice recognition is used herein, it is merely exemplary of many forms of recognizing or identifying an individual person. Others include, but are not limited to fingerprint identification, iris recognition, retina identification, palms recognition, and face recognition. Each of these are similar to the first embodiment in that these are a requirement for monitoring the particular parameter of the individual person; including the parameter to a mathematical representation or algorithm therefore; retrieving a previously stored sample (biometric data), thereof from a database and comparing the stored sample with the input of the accessor.

Figure 2:
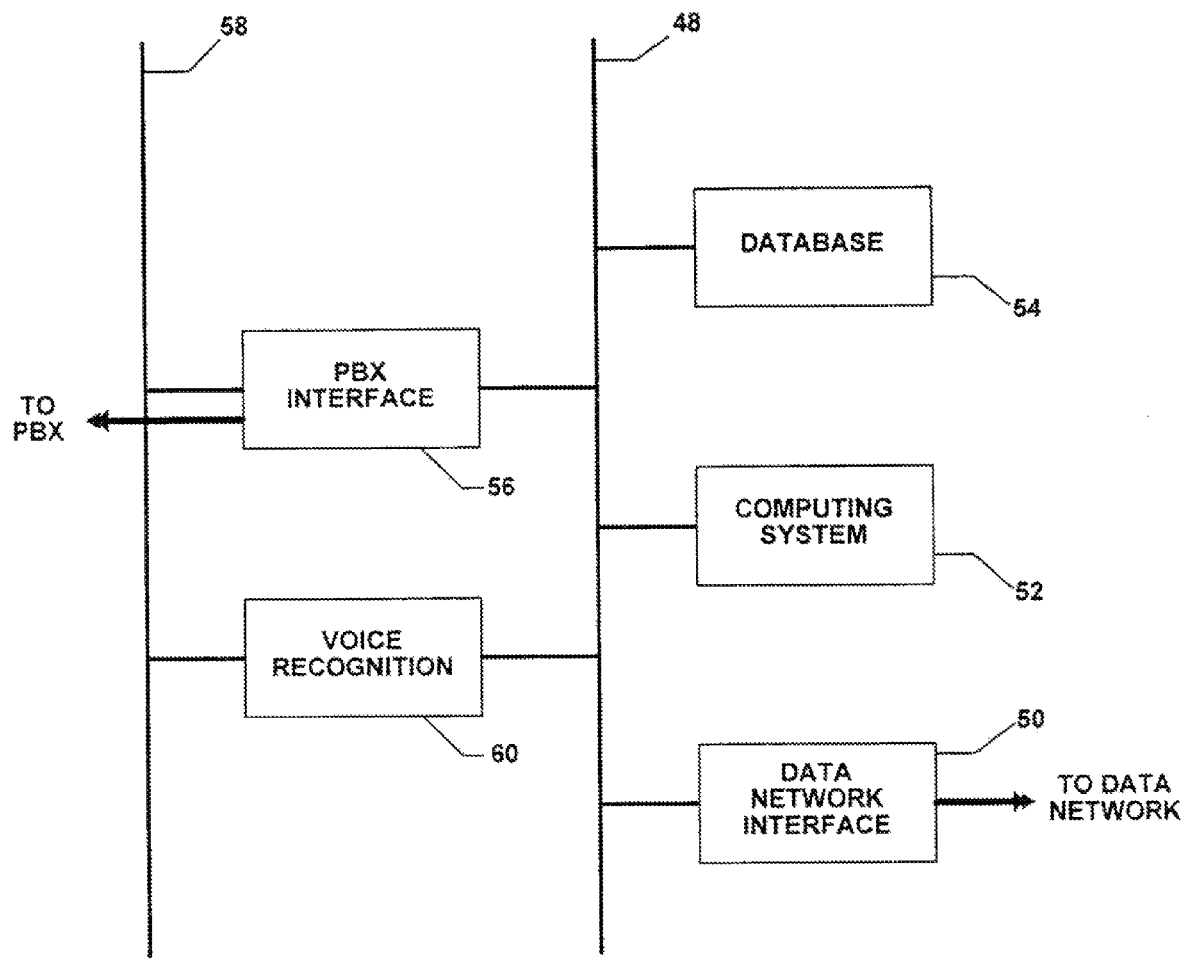
FIG. 2 is a schematic diagram of the apparatus required for the security system shown in FIG. 1.
Figure 3:
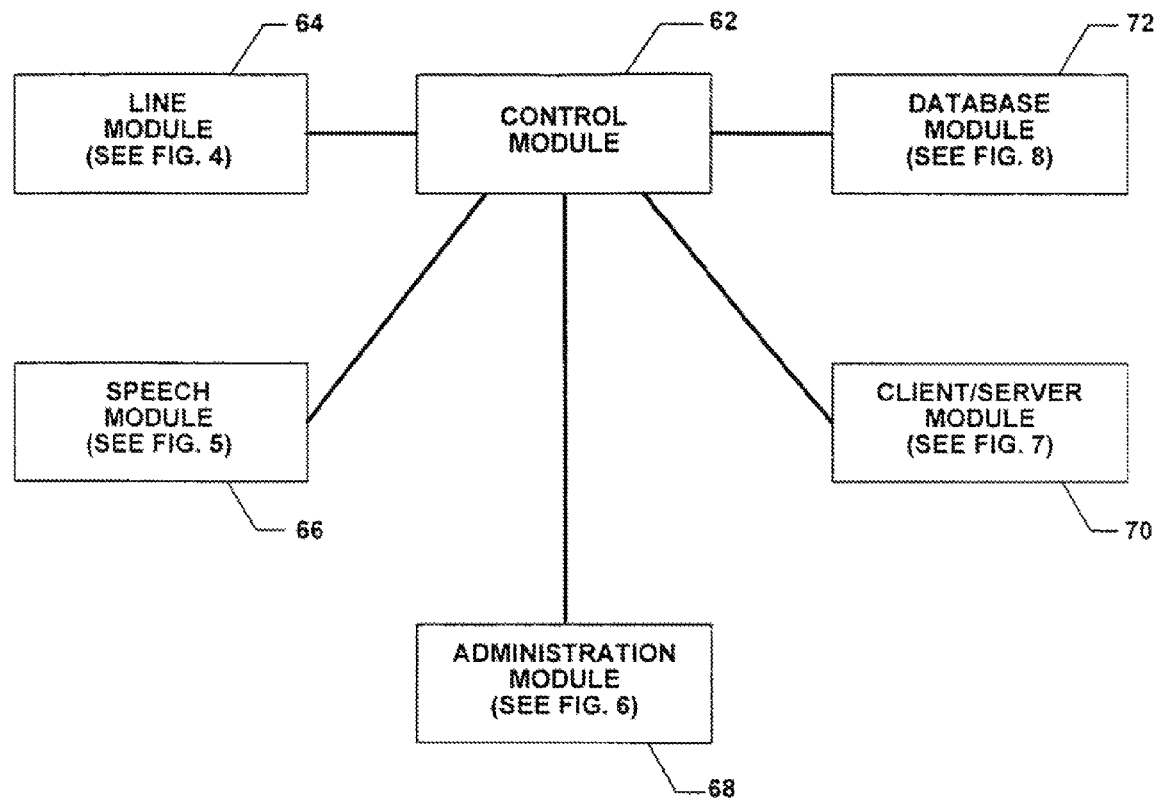
FIG. 3 is a schematic diagram of the software program required for the security system shown in FIG. 1 in which various program modules are shown for corresponding functions of the system and each module is shown in relation to the control module thereof.

Referring now to FIG. 2 a block diagram is shown for the hardware required by the out-of-band security network for computer network applications of this invention. The request-for-access is forwarded from the router 36 of the corporate network to a data network interface 50 which, in turn, is constructed to transfer the request to a dedicated, security network computer 52 over a data bus 48. The computer 52 is adapted to include software programs, see infra, for receiving the user identification and for validating the corresponding password, and is further adapted to obtain the user telephone number from lookup tables within database 54 through data bus 48. The computer 52 is equipped to telephone the user through a PBX interface 56 and voice bus 58. For voice recognition, a speech or biometric system 60 is provided to process requested speech phrases repeated by the user 24 which is verified within the security computer 52. Upon authentication, access is granted through the data network interface 50.

Referring now to FIGS. 3 through 8 the software architecture supporting the above functions is next described. The security computer 52, FIG. 2, is structured to include various functional software modules, FIG. 3, namely, a control module 62, a line module 64, a speech module including a biometric for voice recognition 66, an administration module 68, a client/server module 70, and a database module 72. The software program of the control module 62 functions and interconnects with the other modules (line, speech, administration, client/server and database modules) to control the processing flow and the interfacing with the internal and external system components.

As will be understood from the flow diagram description, infra, the control module 62 software of the security computer 52 incorporates a finite state machine, a call state model, process monitors, and fail-over mechanisms. The software program of the line module 64 is structured to provide an interface with the telephone network. The software program of the speech module 66 is structured to perform processing functions such as, but not limited to, speech verification, text-to-speech conversion and announcements. The software program of the administration module 68 is structured to archive the records of each call made, to provide security and management functions, and to process any alarms generated. The software program of the client/server module 70 is structured to enable a host computer or a web server 34 to interface with the out-of-band security network 40. The software program of the database module 72 is comprised of the databases to support the security network 40 which in the present invention includes an audit database, a subscriber database, a speech database, an announcement database, and a system database.

Figure 4:
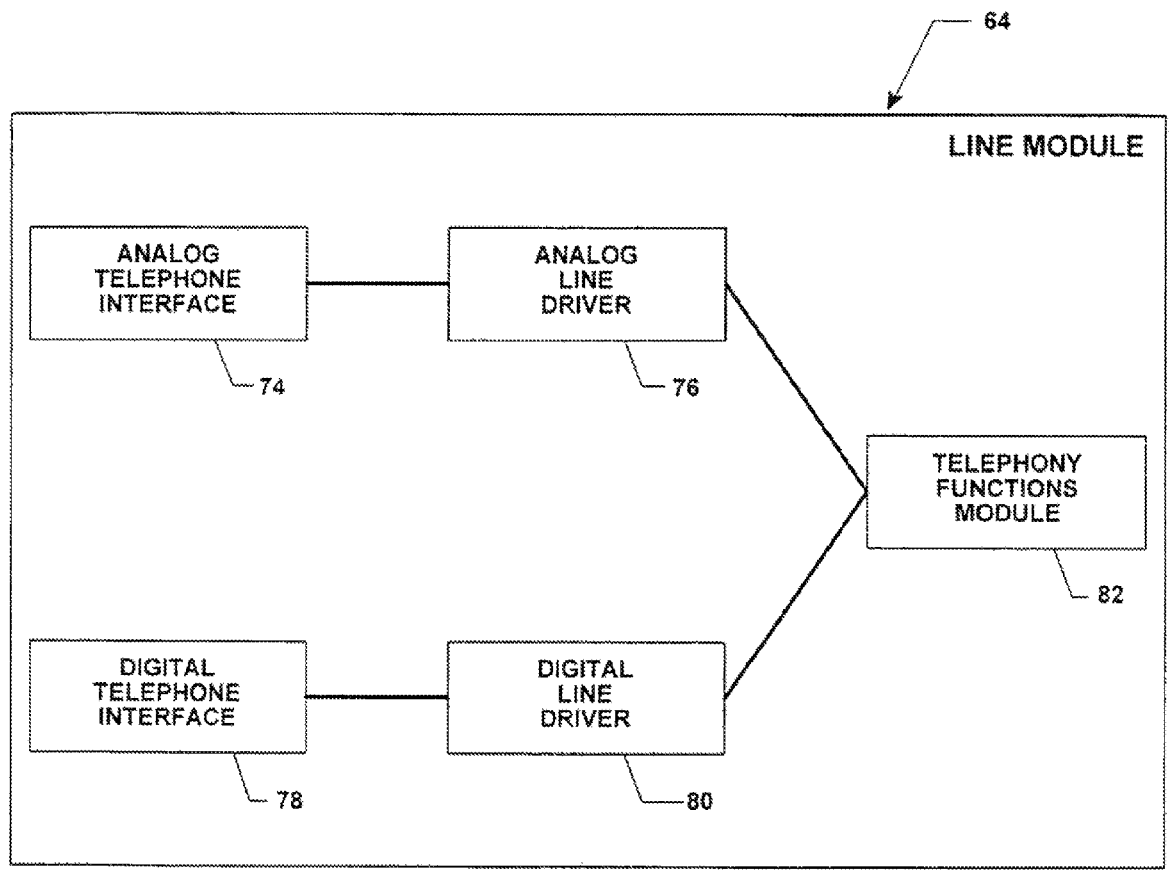
FIG. 4 is a detailed schematic diagram of the software program required for the line module of the security system shown in FIG. 3.

Referring now to FIG. 4, the line module 64 is described in further detail. The analog telephone interface 74 is the equipment, such as voice bus 58 and PBX interface 56, that interfaces to an analog line. The analog telephone interface 74 is, in turn, controlled by software program of the analog line driver 76. Similarly, digital telephone interface 78 is the equipment, such as data bus 48 and PBX interface 56, that interfaces to a digital line (T1 or ISDN PRI)a. The digital telephone interface 78 is, in turn, controlled by the software program of the digital line driver 80. The software program of the telephone functions module 82 is structured to accommodate functions such as, Call Origination, Call Answer, Supervisory signaling, Call Progress signaling, Ring generation/detection, DTMF generation/detection, and line configuration.

Figure 5:
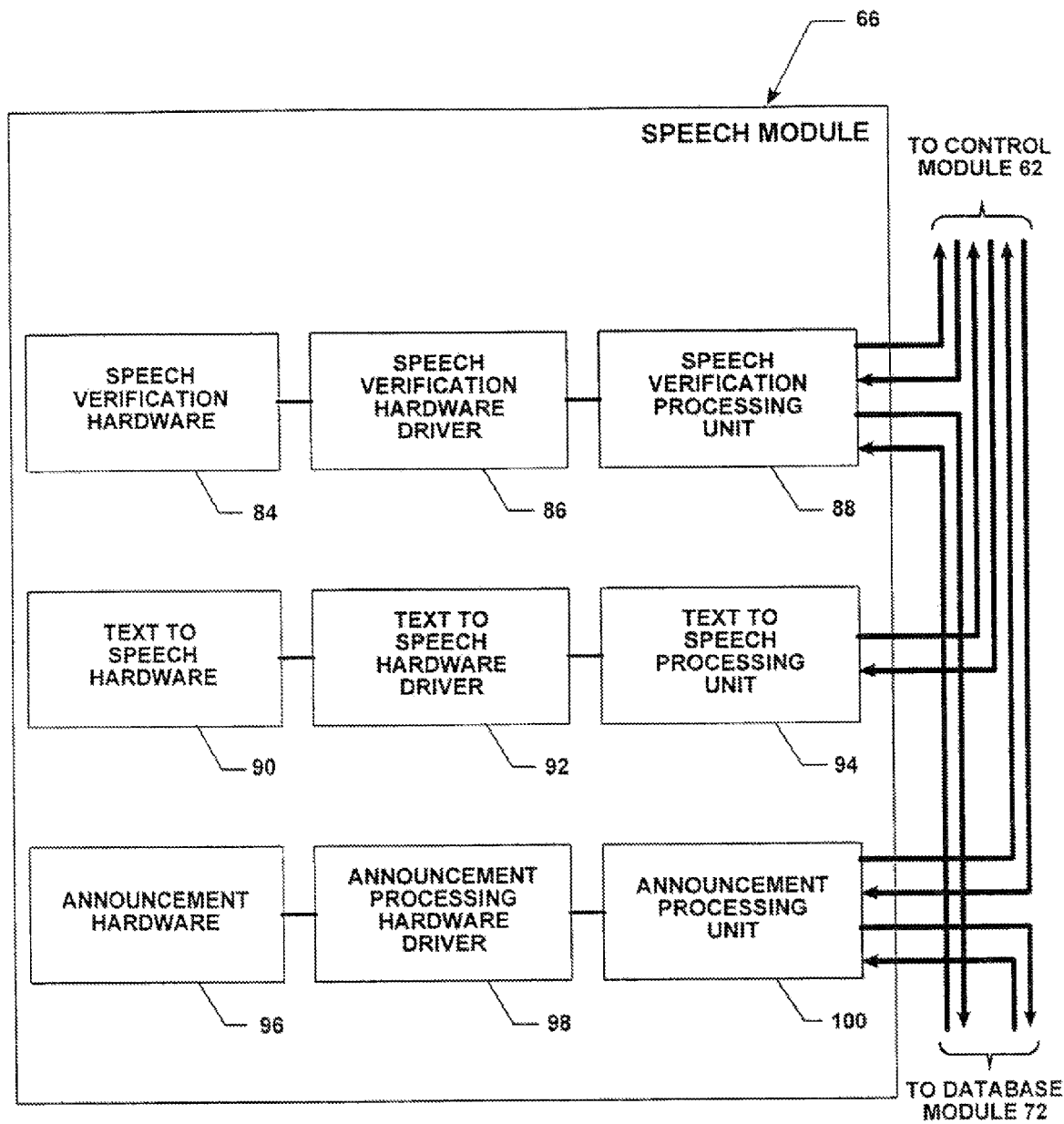
FIG. 5 is a detailed schematic diagram of the software program required for the speech module of the security system shown in FIG. 3.

In FIG. 5 the speech module 66 architecture is detailed. The speech verification (SV) hardware 84, (part of speech system 60, FIG. 2) consists of digital signal processors that utilize SV algorithms for verification of an accessor's spoken password. The speech verification hardware 84 is controlled by the software program of the SV hardware driver 86. The software program of the speech verification processing unit 88 provides an interface with control module 62 and is structured to respond to queries therefrom for verifying an accessor's spoken password. Also, the SV processing unit 88 enables the enrollment of users with the speech password and the interaction of the speech database of database module 72.

The text-to-speech (TTS) hardware 90 consists of digital signal processors that utilize TTS algorithms. The text-to-speech hardware 90 is controlled by the software program of the TTS hardware driver 92. The software program of the TTS processing unit 94 provides an interface with the control module 62 and, as required by the control module 62, converts text strings to synthesized speech. The announcement hardware 96 consists of digital signal processors that utilize speech algorithms to record and play announcements. The announcement hardware is controlled by the software program of the announcement hardware driver 98. The software program of the announcement processing unit 100 also provides an interface with control module 62; upon demands of the control module 62, supplies stored announcements; and interacts with the announcements database of database module 72.

Figure 6:
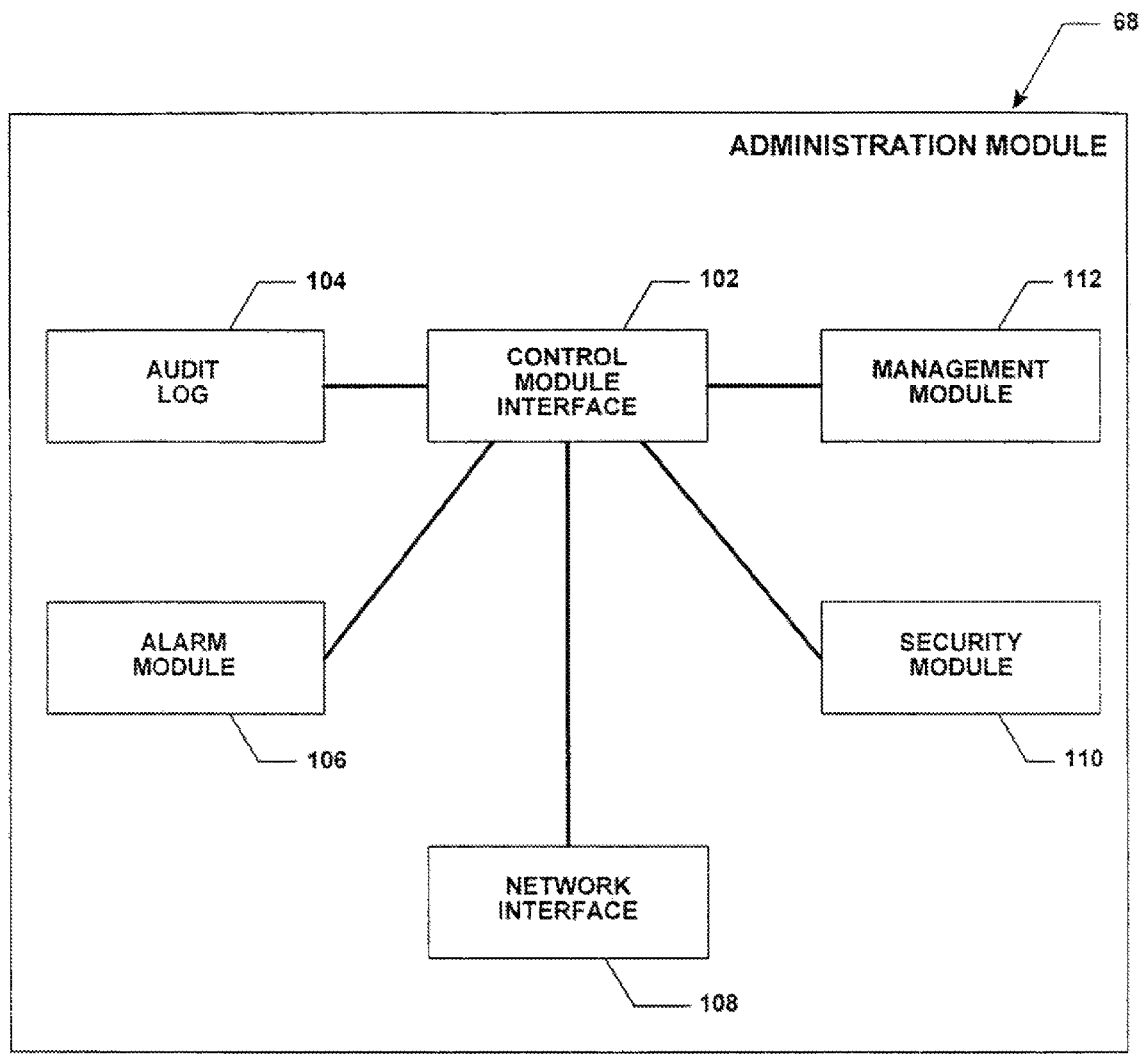
FIG. 6 is a detailed schematic diagram of the software program required for the administration module of the security system shown in FIG. 3.

In FIG. 6, the software program of the administration module 68 is presented in more detail. As the administration module 68 interfaces with the control module 62, see supra, a subprogram, namely, a control module interface 102 is constructed to manage the communication therebetween. The administration module 68 further includes software to provide an audit trail of all calls requesting access. This unit or audit log 104 creates records about each call, which records are stored in the audit database of the database module 72. Any alarms caused as a result of errors, threshold crossing or system failures are processed by the software program of alarm module 106. For remote administration of the out-of-band security system 40 of this invention, the software program of the network interface 108 is provided, which software communicates with the corporate network 38 (via network adapters). Access to the out-of-band security system 40 for administrative purposes is controlled by security module 110. Similar to the network interface 108, the software program of the management module 112 provides for the remote management of the out-of-band security system 40 for configuration, status reporting, software upgrades and trouble-shooting purposes.

Figure 7:
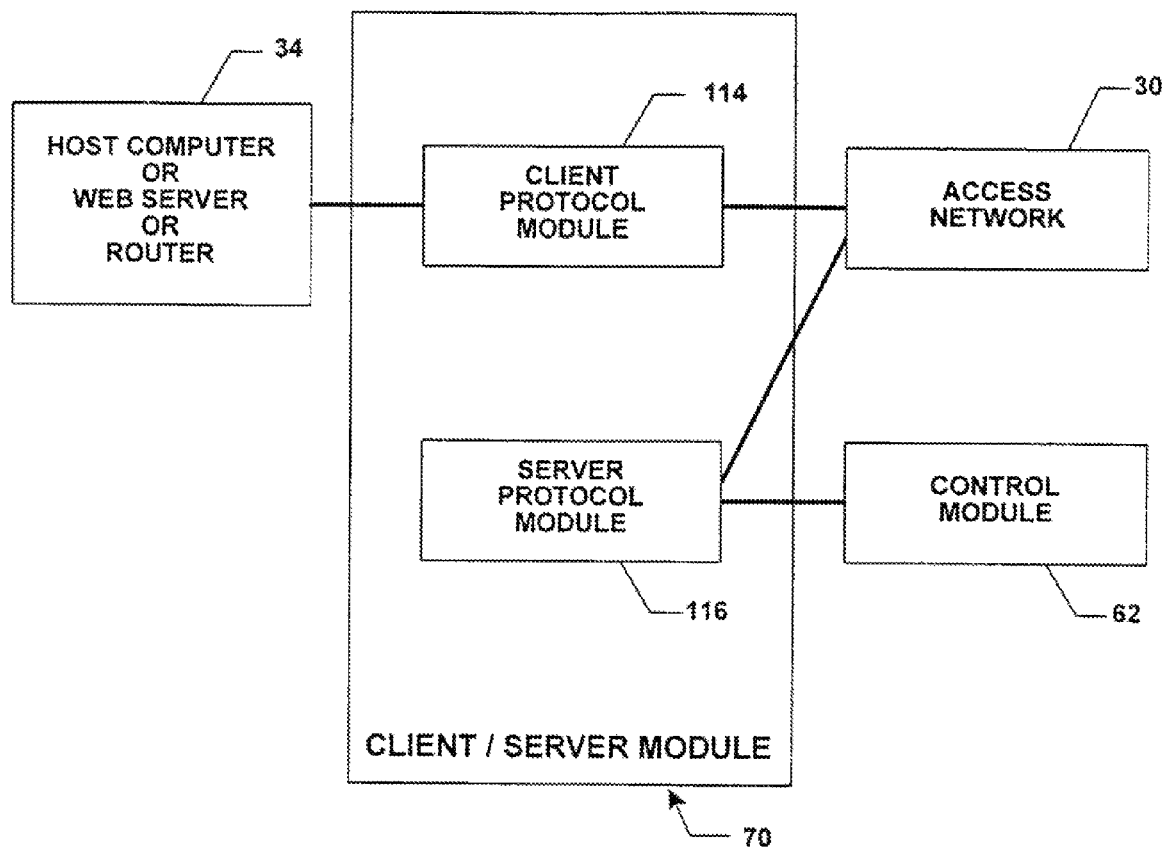
FIG. 7 is a detailed schematic diagram of the software program required for the client/server module of the security system shown in FIG. 3.

Referring now to FIG. 7, the software program of the client/server module 70 that secures the host computer or web server or router 34 of the corporate network 38 through the out-of-band security system 40 of this invention is shown in detail. Here, the client protocol module 114 provides the interfacing means for the host computer or web server 34 and communicates with the out-of-band security system 40 using a proprietary protocol. Alternatively, standard protocols such as RADIUS and TACACS can be used. The server protocol module 116 interfaces with the control module 62 and manages the interaction with the client protocol module 114.

Figure 8:
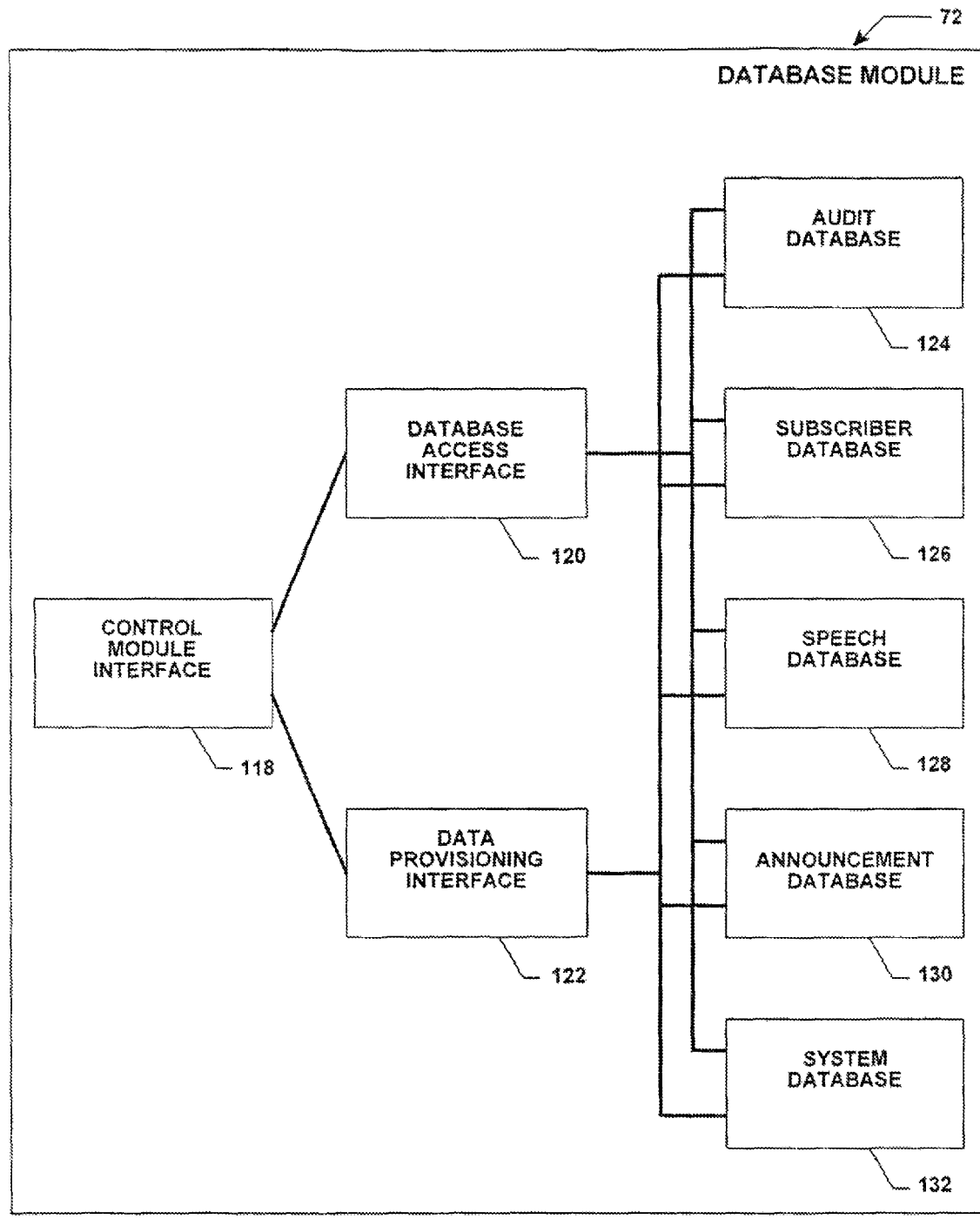
FIG. 8 is a detailed schematic diagram of the software program required for the database module of the security system shown in FIG. 3.
Figure 9A:
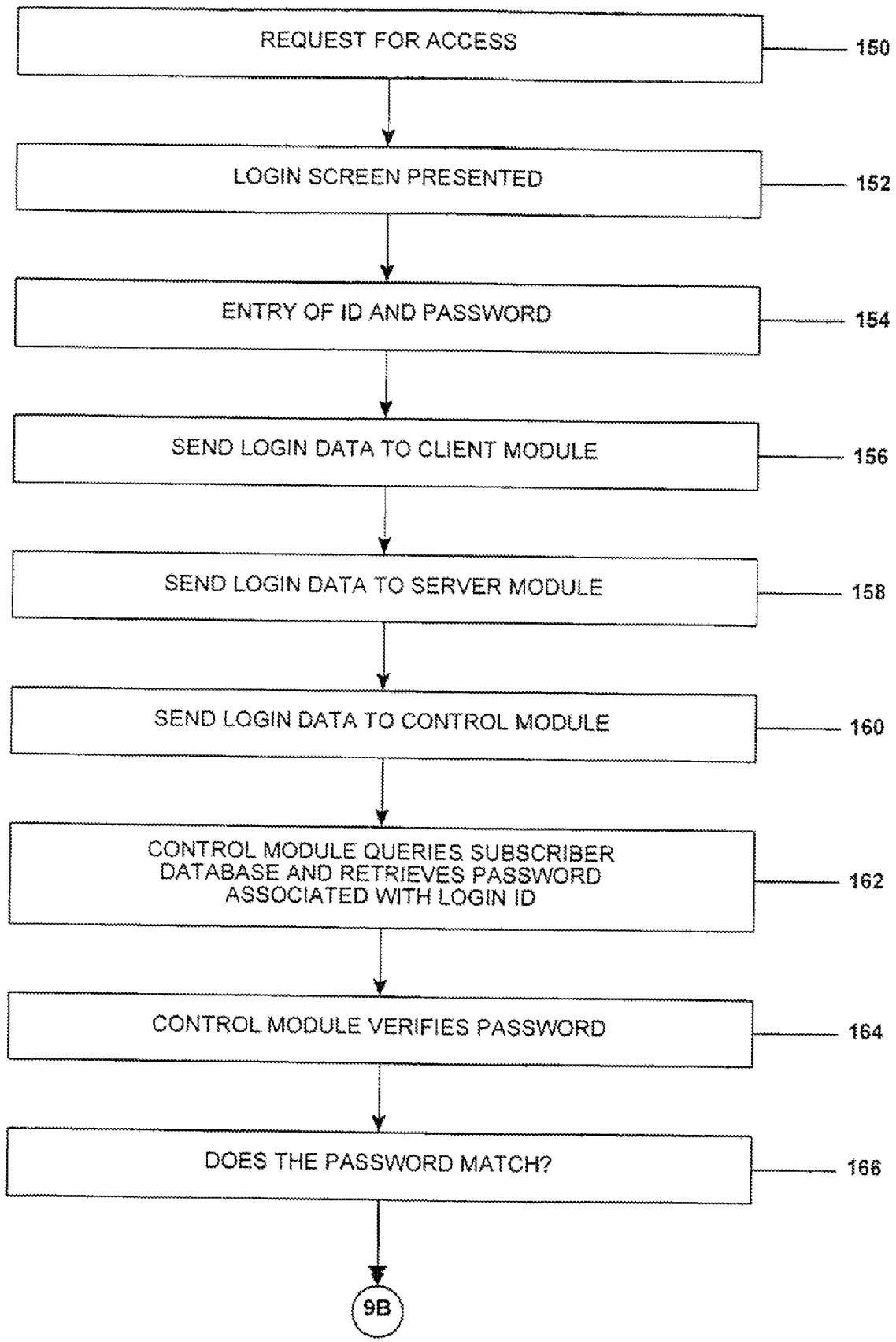
FIG. 9A through 9E is a flow diagram of the software program required for the security system shown in FIG. 1.
Figure 9B:
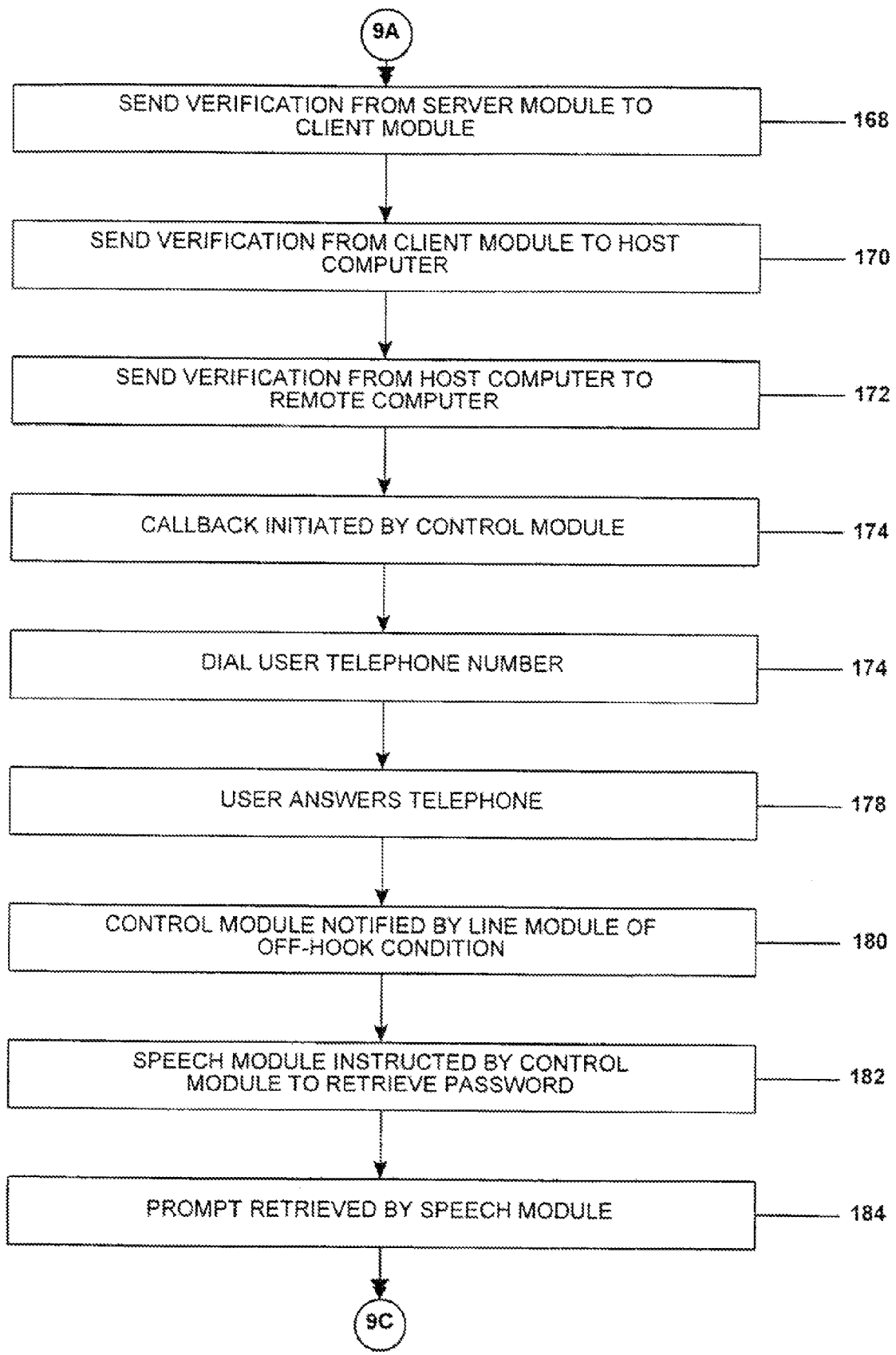
Figure 9C:
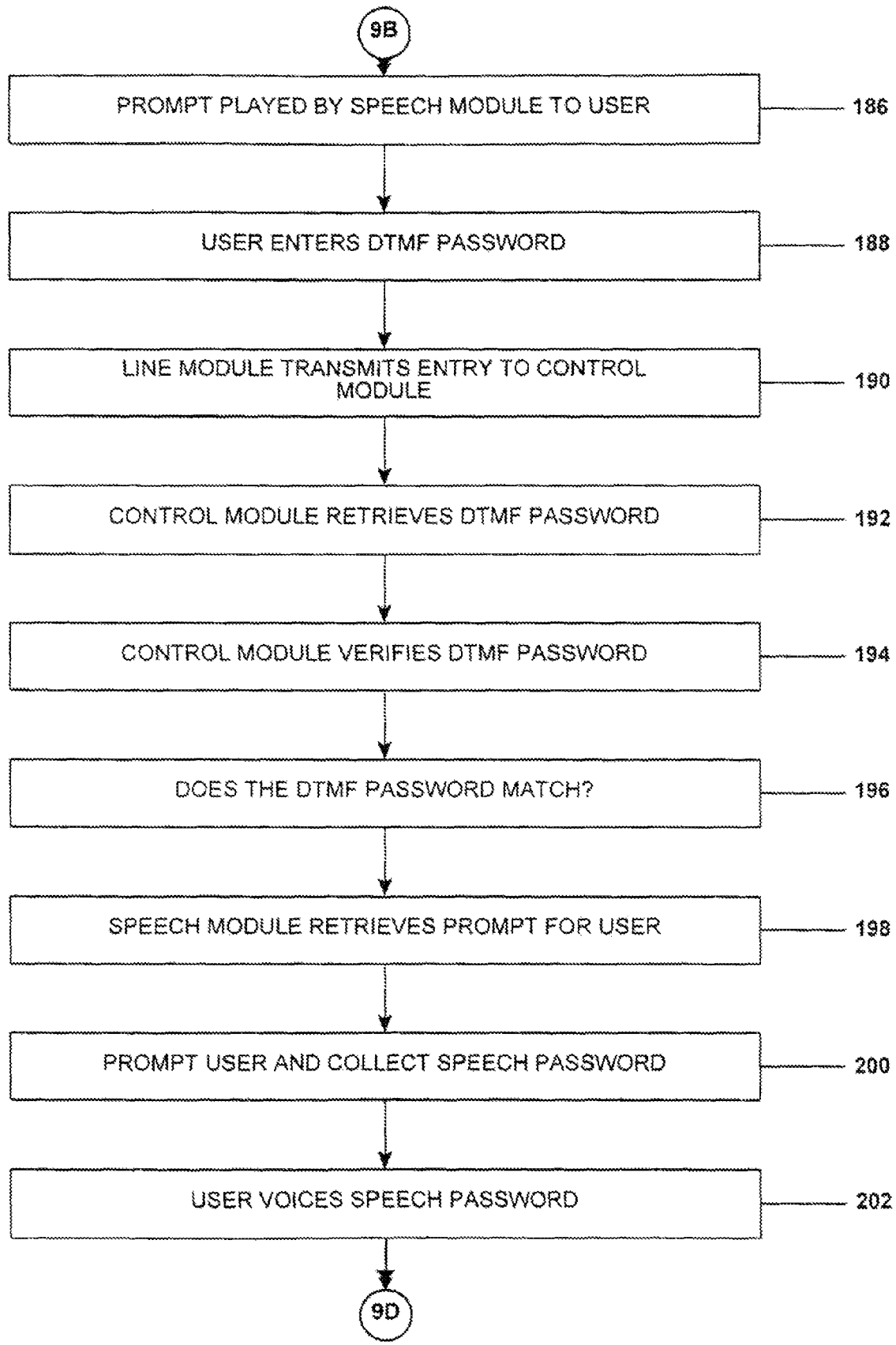
Figure 9D:
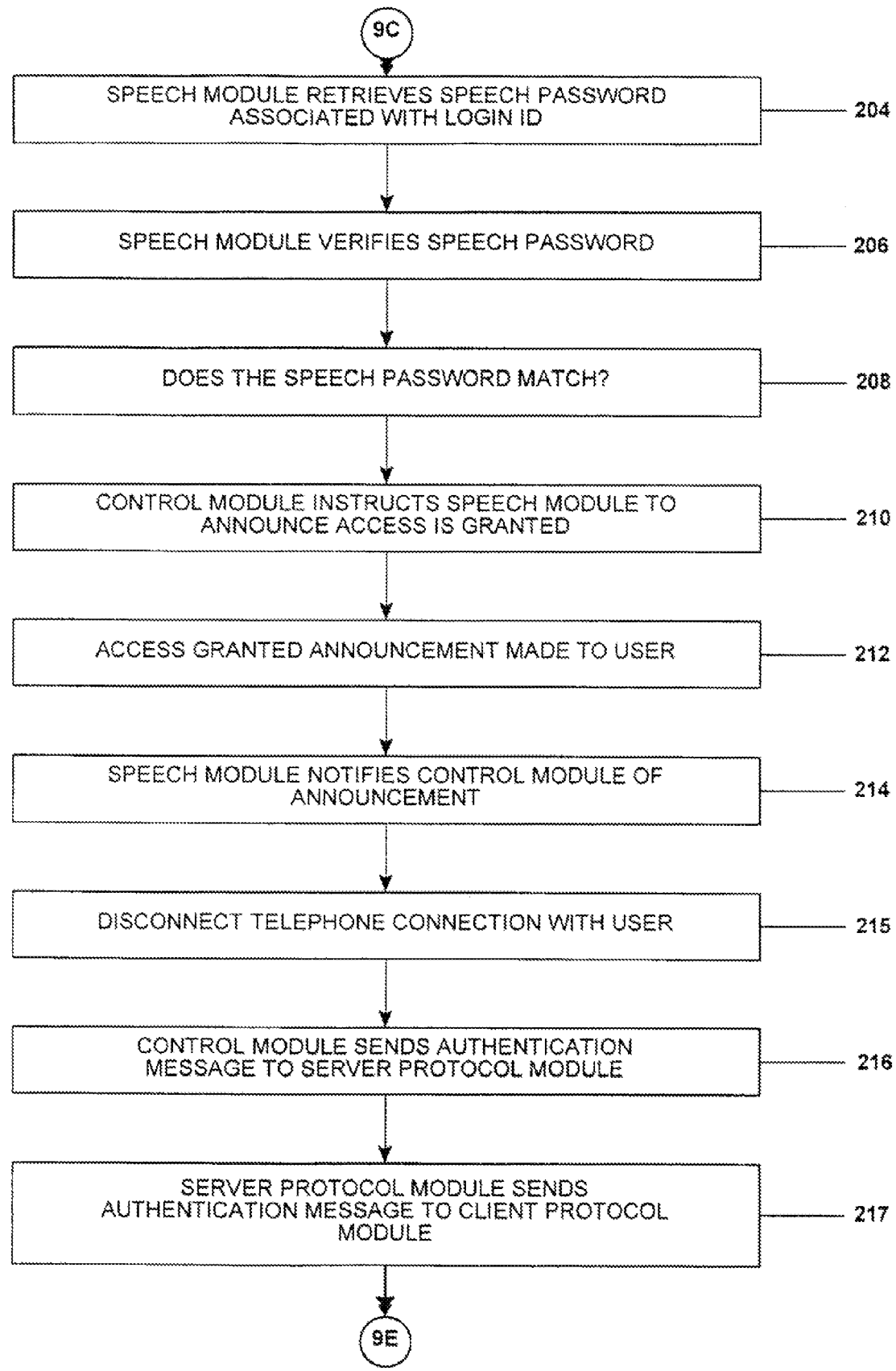
Figure 9E:
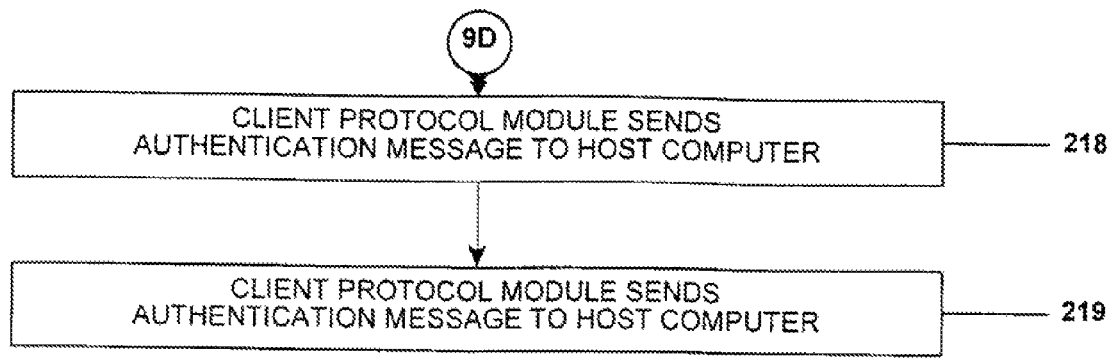

In FIG. 8 a detailed schematic diagram is shown of the software program required for the database module 72 of the out-of-band security system 40 of this invention. The database module 72 is the recordkeeping center, the lookup table repository, and the archival storehouse of the system. In the above description numerous relationships to this module have already been drawn. The database module 72 communicates through control module interface 118 to the control module 62.

Two types of communications are channeled to and from the database module 72, namely, communicating data for use during operations through database access interface 120 and communicating data for maintenance and provisioning of the out-of-band security system through database provisioning interface 122. While the databases described herein are specifically related to the application of this embodiment to voice recognition the formation of specific databases, e.g. a different set of samples of biometric parameters or characteristics, is within the contemplation of the invention. The databases hereof are the audit database 124 for the call records; the subscriber database 126 for subscriber information; the speech database 128 for aid in verifying an accessor's spoken password; the announcements database 130 for announcements to be played to users during a call; and, system database 132 for system related information (e.g. configuration parameters).

In FIG. 9A through 9E the flow diagram for the above software program operation is shown and is described hereinbelow. Thus, while the preceding in discussing the network architecture for the out-of-band security system 40 explains the access portion of the program—the operations side—and the configuration and maintenance portion of the program—the provisioning side, the description which follows is of the software operation of the out-of-band security system 40 from the receipt of a request-to-access inquiry to a granting-of-access or denial-of-access result. The logic description that follows reflects the accessor's inputs and the programmed processes along the logical pathway from the receipt of a request-to-access inquiry to a granting-of-access or denial-of-access result.

The pathway commences at the REQUEST FOR ACCESS block 150 whereby a request to enter the host computer or web server 34 is received from the user at the remote computer 22. The user requesting access to the host computer from the remote computer is immediately prompted to login at the LOGIN SCREEN PRESENTED block 152. While the login procedure here comprises the entry of the user identification and password and is requested by the host computer 34, such information request is optionally a function of the security computer 40. Upon entry of data by user at the ENTRY OF ID AND PASSWORD block 154 the information is passes to the security computer 40.

As described in the software architecture review, supra, the software pathway of the login data is first to client module 114 at SEND LOGIN DATA TO CLIENT MODULE block 156 and then successively to server module 116 at SEND LOGIN DATA TO SERVER MODULE block 158 and to control module 62 at SEND LOGIN DATA TO CONTROL MODULE block 160. In transmitting the login data from the client module 114 to the server module a proprietary protocol is employed, which protocol includes encryption of the data using standard techniques. The verification process is continued at the control module 62 which next enters the subscriber database 126 and retrieves at CONTROL MODULE QUERIES SUBSCRIBER DATABASE AND RETRIEVES PASSWORD ASSOCIATED WITH LOGIN ID block 162 the password associated with the logged in identification. The control module 62 verifies at CONTROL MODULE VERIFIES PASSWORD block 164 that the password received from the remote computer 22 is the same as the password retrieved from the subscriber database 126.

Upon verification, the control module 62 at DOES THE PASSWORD MATCH? block 166 sends confirmation thereof back along the software pathway to inform the user of the event. Upon failure to verify, the control module 62 at DOES THE PASSWORD MATCH? block 166 initiates an alarm indicating that the login conditions were not met. The software program upon an alarm condition terminates processing. Alternatively, the program offers the user an opportunity to retry whereupon there is a retracement through the same software path as just described and then, upon repeated alarm occurrence, the software terminates processing. The retry process may be limited to a specified number of times. The message that the verification has been achieved is transmitted along the software pathway substantially in the reverse manner as the login data transmission.

From the control module 62, the verification is first received by the server module 116 and at SEND VERIFICATION FROM SERVER MODULE TO CLIENT MODULE block 168 the verification message along with the information that the authentication is proceeding is transmitted to the client module 114. In transmitting these messages to the client module 114 from the server module a proprietary protocol is employed, which protocol includes decryption of the data, where required, using standard techniques. The client module 114 transmits at SEND VERIFICATION FROM CLIENT MODULE TO HOST COMPUTER block 170 the message to the host computer 34. Finally, the host computer 34 transmits at SEND VERIFICATION FROM HOST COMPUTER TO REMOTE COMPUTER block 172 the message that the login verification is complete is sent to the remote computer 22 and prompts the person or user 24 to stand by for a telephonic callback.

Now with the control module 62 having verified the remote computer 22, the software program hereof is constructed to have the control module 62 at CALLBACK INITIATED BY CONTROL MODULE block 174 initiate out-of-band the call-back procedure to the user 24. The control module 62 queries the subscriber database 126 and retrieves therefrom the telephone number associated with the login identification. Based on the data retrieved from the subscriber database, the control module 62 instructs the line module 64 at DIAL USER TELEPHONE NUMBER block 176 to call user 24. Upon user 24 answering the telephone at USER ANSWERS TELEPHONE block 178, the software pathway continues with the line module 64 relaying to the control module 62 at CONTROL MODULE NOTIFIED BY LINE MODULE OF OFF-HOOK CONDITION block 180 that the user's telephone is off-hook. The program is constructed so that the control module 62 then instructs the speech module 66 at SPEECH MODULE INSTRUCTED BY CONTROL MODULE TO RETRIEVE PASSWORD block 182 to retrieve (or generate) a DTMF password. To accomplish this, the speech module 66 now queries the announcement database 130 at PROMPT RETRIEVED BY SPEECH MODULE block 184 retrieves the prompt to be played to the user 24. Alternatively, the password for the prompt is generated and synthesized by the text-to-speech system 90, 92 and 94 of the speech module 66.

At PROMPT PLAYED BY SPEECH MODULE TO USER block 186, the user 24 is instructed to impress the DTMF password on the telephone keypad. The program progresses so that after the user 24 enters the DTMF password on the telephone keypad at USER ENTER DTMF PASSWORD block 188, the line module 64 at LINE MODULE TRANSMITS ENTRY TO CONTROL MODULE block 190 notifies the control module 62 of the entry made by user 24. In the manner similar to the login password, supra, the control module 62 queries the subscriber database and, at CONTROL MODULE RETRIEVES DTMF PASSWORD block 192, retrieves the password or the generated password associated with the subscriber. At CONTROL MODULE VERIFIES DTMF PASSWORD block 194, the control module 62 verifies that the password entered at the telephone keypad by the user matches the password retrieved from the subscriber database. Upon verification, the control module 62 at DOES THE DTMF PASSWORD MATCH? block 196 sends confirmation thereof back along the software pathway to inform the user of the event.

Upon failure to verify, the control module 62 at DOES THE DTMF PASSWORD MATCH? block 196 initiates an alarm indicating that the login conditions were not met. The software program upon an alarm condition terminates processing. As in the previous password verification and alternatively, the program offers the user an opportunity to retry. Whereupon there is a retracement through the same software path as just described and then, upon repeated alarm occurrence, the software program terminates processing. As before, the retry process may be limited to a specified number of times.

Upon out-of-band callback verification being received, the biometric identification portion of the software program is initiated. In this present embodiment, while the biometric parameter that is monitored is speech, any of a number of parameters may be used. In this case, the control module 62 instructs the speech module 66 at SPEECH MODULE RETRIEVES PROMPT FOR USER block 198 to retrieve a prompt that for the purpose of later playing the prompt to the user and collecting the speech password. The speech module 66 queries the announcement database 130 and retrieves the prompt to be played to the user 24. Besides using a prepared prompt, as above, a prompt synthesized by the text-to-speech system 90, 92 and 94 is utilizable for this purpose.

The prompt for collecting the speech password is played to the user 24 at PROMPT USER AND COLLECT SPEECH PASSWORD block 200. The user 24, who has previously had his biometric sample, namely the speech pattern, registered with the speech database 128, the voices the speech password at USER VOICES SPEECH PASSWORD block 202 and transmits the same over the telephone at the remote computer 22 to the security computer 40. Then, at SPEECH MODULE RETRIEVES SPEECH PASSWORD ASSOCIATED WITH LOGIN ID block 204, the software program for the speech module 66 is adapted to query the speech database 128 and to retrieve the speech password associated with the accessor's login identification. Through the application of biometric analysis, such as voice recognition technology, the speech or module 66 at SPEECH MODULE VERIFIES SPEECH PASSWORD block 206 verifies that the voiced speech password received from the user 24 has the same pattern as the speech password retrieved from database 128.

Upon verification, the speech module 66 at DOES THE SPEECH PASSWORD MATCH? block 208 sends confirmation thereof back along the software pathway to inform the user of the event. Upon failure to verify, the speech module 66 at DOES THE SPEECH PASSWORD MATCH? block 208 notifies the control module 62 which initiates an alarm indicating that the login conditions were not met. The software program upon an alarm condition terminates processing. As in the previous password verification and alternatively, the program offers the user an opportunity to retry. Whereupon there is a retracement through the same software path as just described and then, upon repeated alarm occurrence, the software program terminates processing.

As before, the retry process may be limited to a specified number of times. Upon being notified of a match between the pattern of the voiced speech password and that of the one retrieved from the database 128, the control module 62 at CONTROL MODULE INSTRUCTS SPEECH MODULE TO ANNOUNCE ACCESS IS GRANTED block 210 instructs the speech module 66 to provide an announcement to the user 24 indicating that access is granted. The speech module 66 queries the announcement database 130 and retrieves the announcement for the user 24. Alternatively, the announcement can be synthesized by the text-to-speech system 90, 92 and 94 and played to the user 24. Whichever announcement is used, it is made to the user at ACCESS GRANTED ANNOUNCEMENT MADE TO USER block 212.

Upon completion of the announcement at SPEECH MODULE NOTIFIES CONTROL MODULE OF ANNOUNCEMENT block 214, the speech module 66 notifies the control module 62 that the announcement has been made to the user 24. At this point at DISCONNECT TELEPHONE CONNECTION WITH USER block 215, the control module 62 instructs the line module 64 to terminate the telephone connection and the telephone connection between the security computer 40 and user 24 is severed. At CONTROL MODULE SENDS AUTHENTICATION MESSAGE TO SERVER PROTOCOL MODULE block 216, the message that the user 24 is authenticated is relayed by control module 62 to server protocol module 116 which is requested to communicate the same to the client protocol module 114.

At SERVER PROTOCOL MODULE SENDS AUTHENTICATION MESSAGE TO CLIENT PROTOCOL MODULE block 217, the message is relayed to the client protocol module 114 and thence via a proprietary protocol, at CLIENT PROTOCOL MODULE SENDS AUTHENTICATION MESSAGE TO HOST COMPUTER block 218, to the host computer 34. The host computer or web server 34 at HOST COMPUTER GRANTS ACCESS TO USER block 219 grants access to the authenticated used 24.

Figure 10:
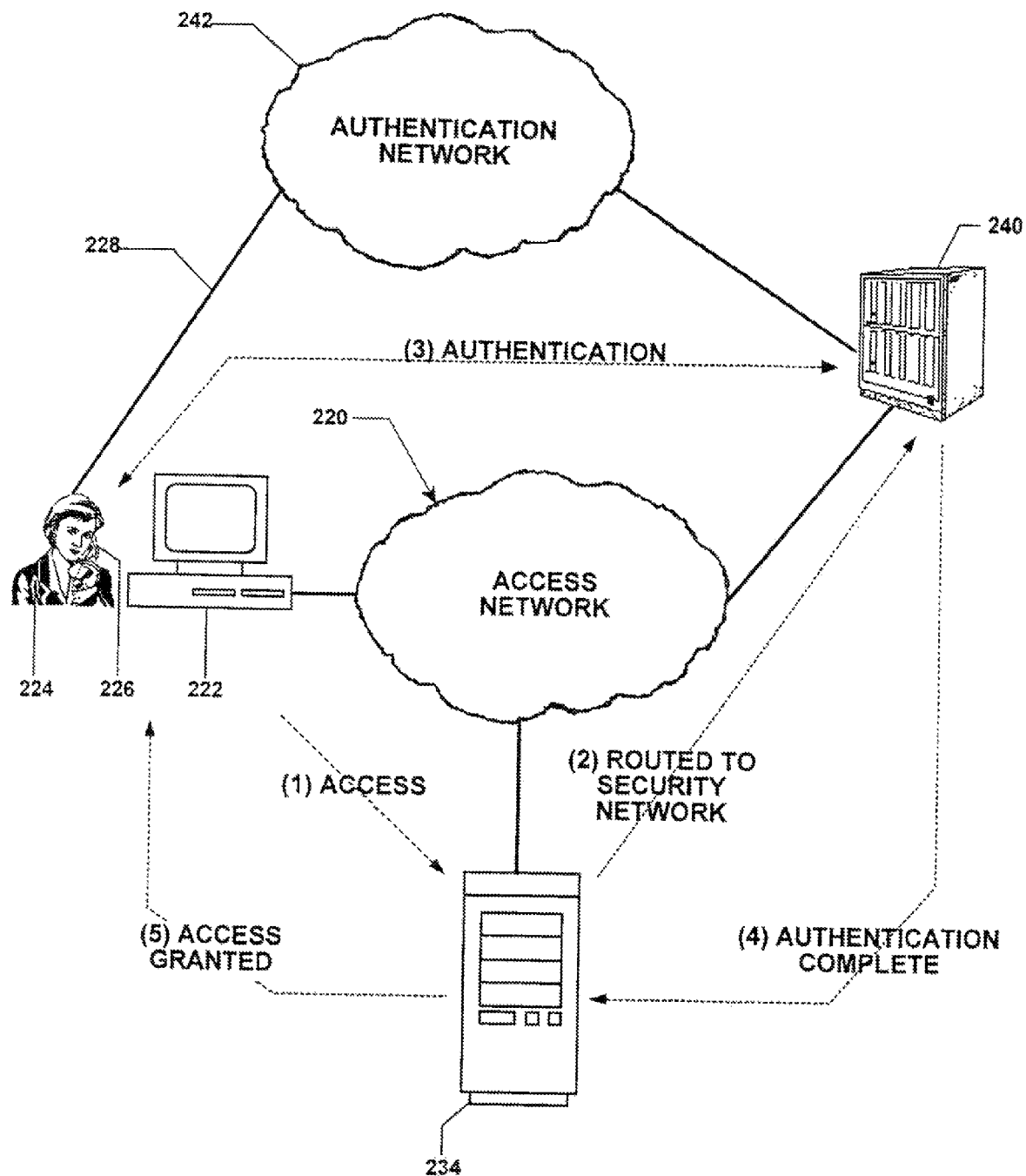
FIG. 10 is a schematic diagram of a second embodiment of the security system of the present invention as applied to the intranet in which an internal accessor in a local area network seeks entry into a restricted portion of the host system.

In FIG. 10 a schematic diagram of the second embodiment of the present invention is shown. For ease of comprehension, where similar components are used, reference designators "200" units higher are employed. In contrast to FIG. 1 which describes the out-of-band security networks for computer networks of this invention as applied to the internet or wide area networks, this embodiment describes the application to local area networks. The second embodiment is referred to generally by the reference designator 220. Here the accessor is the computer equipment 222, including the central processing unit and the operating system thereof, and the person or user 224 whose voice is transmittable by the telephone 226 over telephone lines 228.

While in this example the biometric parameter monitored is voice patterns as interpreted by voice recognition systems, any of a number of other parameters may be used to identify the person seeking access. The access network 230 is constructed in such a manner that, when user 224 requests access to a high security database 232 located at a host computer 234 through computer 222, the request-for-access is diverted by a router 236 internal to the corporate network 238 to an out-of-band security network 240. Here the emphasis is upon right-to-know classifications within an organization rather than on avoiding entry by hackers.

Thus, as the accessor is already within the system, the first level of verification of login identification and password at the host computer is the least significant and the authentication of the person seeking access is the most significant. Authentication occurs in the out-of-band security network 240, which is analogous to the one described in detail above, except the subscriber database becomes layered by virtue of the classification. This is in contradistinction to present authentication processes as the out-of-band security network 240 is isolated from the corporate network 238 and does not depend thereon for validating data. The overview shows the biometric validation which, in this case, takes the form of a voice network 242.

Figure 11:
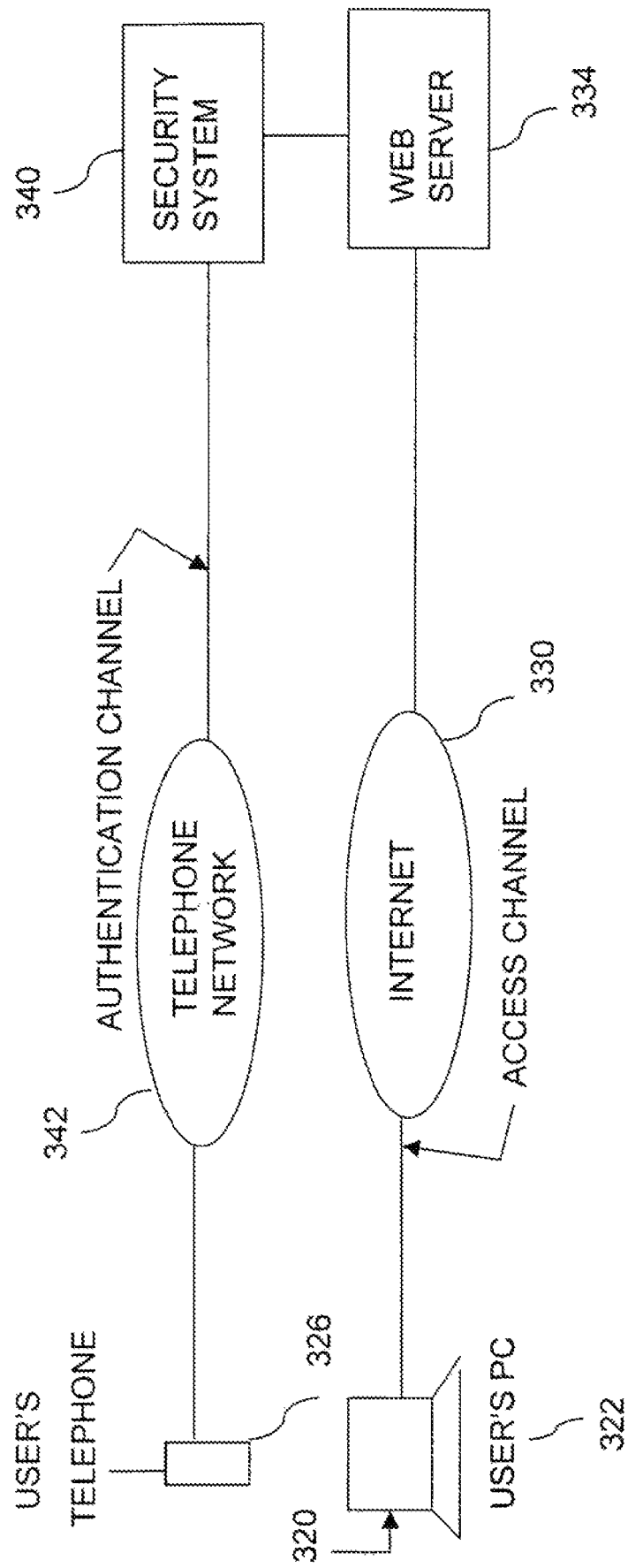
FIG. 11 is a schematic diagram of the third embodiment of the security system using as peripheral devices a cellular telephone and a fingerprint verification device.

In FIG. 11 a schematic diagram of the third embodiment of the present invention is shown. This embodiment describes the application of the security system to access over the internet. For ease of comprehension, where similar components are used, reference designators "300" units higher are employed. In contrast to FIG. 1 which describes the out-of-band security networks for computer networks of this invention as applied to wide area networks, this embodiment describes the application to internet networks. The third embodiment is referred to generally by the reference designator 320. The case of user accessing a web application, such as an online banking application, (located on a web server 334) over the internet 330. The user from a computer 322 accesses the web application over an access channel and enters their USER ID. The web server 334 sends the USER ID to the security system 340, also referred to as the centralized out-of-band authentication system (COBAS). COBAS 340 proceeds with authenticating the user through the user's cellular telephone over an authentication channel. The security system 340 calls the access-seeking user at the cellular telephone 326. The user answers the phone and is prompted to enter a password for password verification and to enter a biometric identifier, such as a fingerprint. The security system 340 authenticates the user and sends the result to the web server 334. Upon a positive authentication and after disconnecting from the authentication channel, access is granted along the access channel to the USER'S PC device 322.

Figure 12:
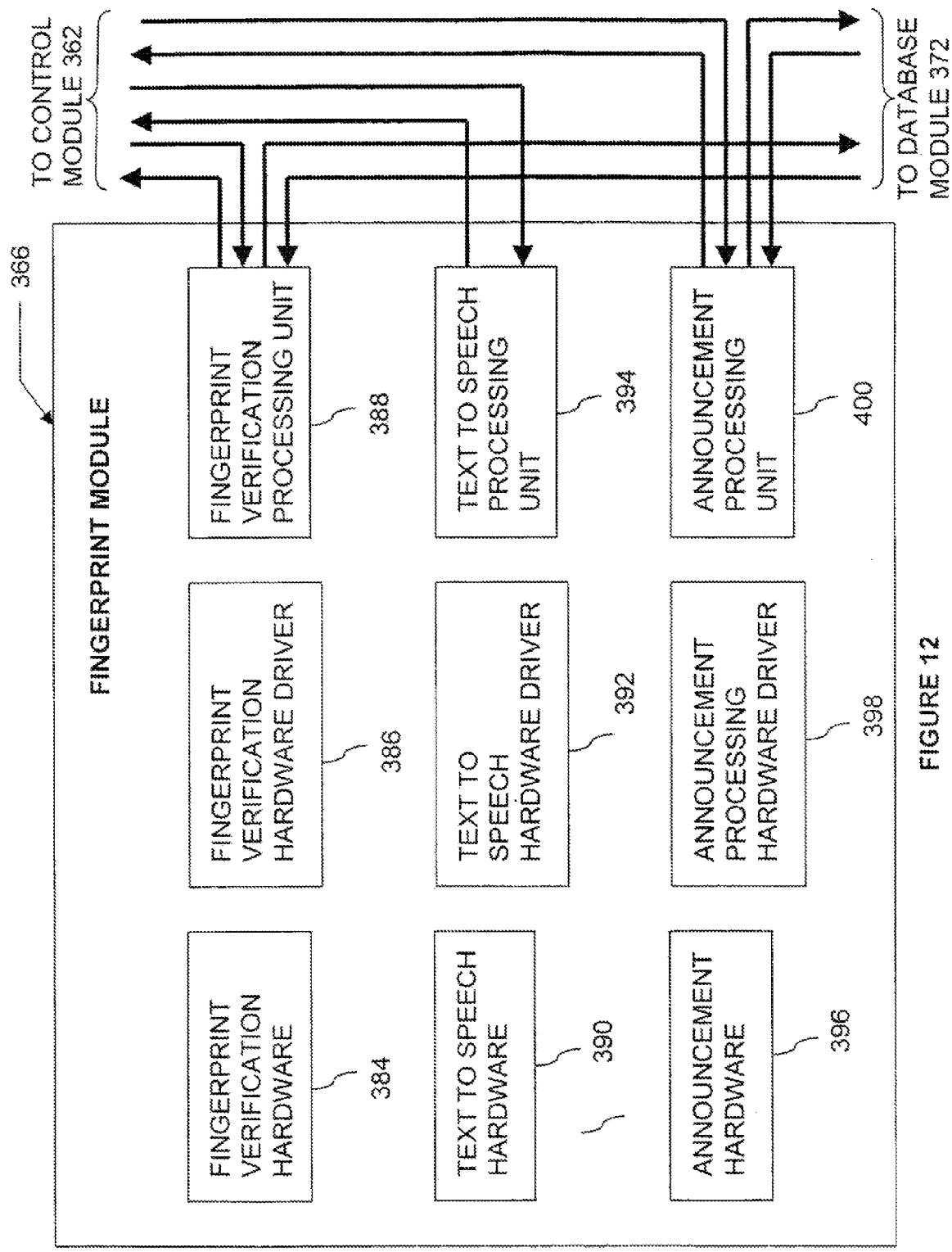
FIG. 12 is a detailed schematic diagram of the software program required for the fingerprint module of the security system shown in FIG. 11; and, FIG. 13 is a detailed schematic diagram of the fourth embodiment of the security system using as peripheral devices a personal digital assistant (PDA) and the associated fingerprint verification device.

The flow diagram for the COBAS device 340 software is analogous to that described in the first embodiment, supra, but for the speech module 66. In lieu thereof, in FIG. 12 the fingerprint module 366 architecture is detailed. The fingerprint verification hardware 384, consists of digital signal processors that utilize algorithms for verification of an accessor's fingerprint. The fingerprint verification hardware 384 is controlled by the software program of the fingerprint hardware driver 386. The software program of the fingerprint verification processing unit 388 provides an interface with control module 362 and is structured to respond to queries therefrom for verifying an accessor's password. Also, the fingerprint processing unit 388 enables the enrollment of users fingerprint and the interaction of the fingerprint database of the COBAS device 340.

The text-to-speech (TTS) hardware 390 consists of digital signal processors that utilize TTS algorithms. The text-to-speech hardware 390 is controlled by the software program of the TTS hardware driver 392. The software program of the TTS processing unit 394 provides an interface with the control module 362 and, as required by the control module 362, converts text strings to synthesized speech. The announcement hardware 396 consists of digital signal processors that utilize speech algorithms to record and play announcements. The announcement hardware is controlled by the software program of the announcement hardware driver 398. The software program of the announcement processing unit 400 also provides an interface with control module 362; upon demands of the control module 362, supplies stored announcements; and interacts with the announcements database of the related database (not shown).

Figure 13:
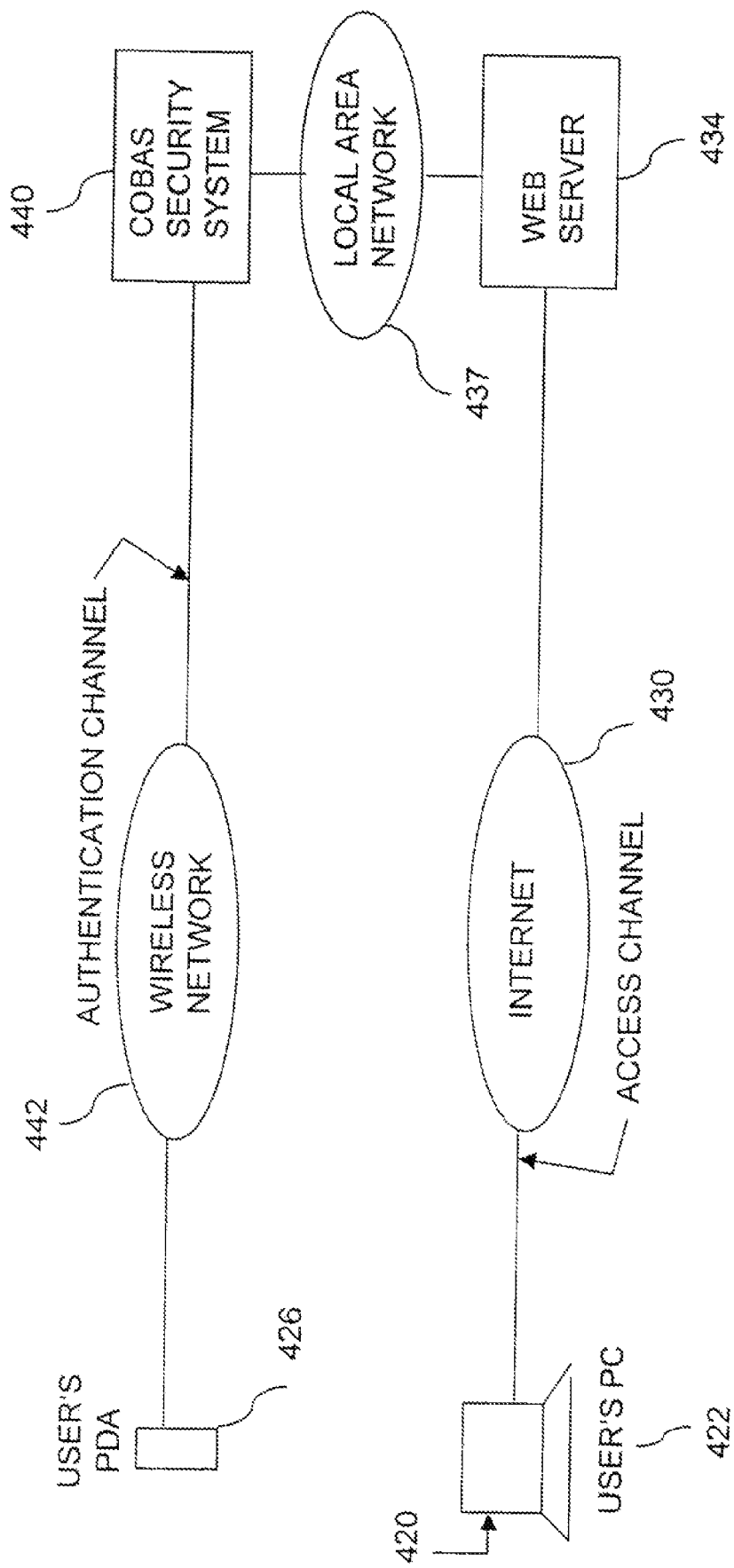

In FIG. 13 a schematic diagram of the fourth embodiment of the present invention is shown. This embodiment describes the application to PDAs (Personal Digital Assistant). For ease of comprehension, where similar components are used, reference designators "400" units higher are employed. In contrast to FIG. 1 which describes the out-of-band security networks for computer networks as applied to wide area networks, this embodiment describes the application to wireless networks including peripherals, such as PDAs and cellular telephones. The fourth embodiment is referred to generally by the reference designator 420.

Although there are several PDAs currently marketing including the Blackberry and the Palm Computer, in this embodiment an HP iPAQ running on a Windows CE operating system is utilized. These PDAs have wireless capabilities and can also incorporate custom software applications. The HP iPAQ hereof incorporates a fingerprint reader. The security system 420 has two distinct and independent channels of operation, namely, the access channel and the authentication channel. The user from a computer 422 accesses the web application over an access channel and enters their USER ID. The web server 434 sends the USER ID to the security system 440. COBAS 440 proceeds with authenticating the customer via the wireless network 442 over an authentication channel.

The security system 440 sends an authentication request message to a software program located on the PDA 422. The software program prompts the user to enter their fingerprint. The COBAS security system 440 now authenticates the user's fingerprint against the template stored in its database and send the result to the web server 434. Upon a positive authentication and after disconnecting from the authentication channel, access is granted along the access channel to the USER'S PDA device 422.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:
1. A security system for accessing a host computer comprising:
   an access channel comprising:
      an interception device for receiving a login identification originating from an accessor for access to said host computer; and
   an authentication channel comprising:
      a security computer for receiving from said interception device said login identification and for communicating access information to said host computer and for communicating with a peripheral device of said accessor;
      a database having at least one peripheral address record corresponding to said login identification;
      a prompt mechanism for instructing said accessor to enter predetermined data at and transmit said predetermined data from said peripheral device; and
      a comparator for authenticating access demands in response to the transmission of said predetermined data by verifying a match between said predetermined data and said entered and transmitted data,
   wherein said security computer outputs an instruction to the host computer to either grant access thereto using said access channel or to deny access thereto.

2. A security system as described in claim 1, wherein:
   said peripheral device is a telephone with a tone generating keypad for entering data; and,
   said prompt mechanism is an auditory message describing data to be entered.

3. A security system as described in claim 2, said security computer further comprises:
   an announcement database; and
   a voice module for selecting a prerecorded auditory message from said announcement database and, for prompting the entry of data by said accessor, playing said prerecorded auditory message over said telephone.

4. A security system as described in claim 3, wherein upon outputting an instruction to the host computer to grant access, said security computer communicates in said authentication channel the access information to said accessor by selecting and transmitting an access-granted message from said announcement database and sequentially disconnecting from the connection with said telephone prior to use of said access channel.

5. A security system as described in claim 2, said authentication channel further comprises:
   a voice module, capable of synthesizing an auditory message, and, for prompting the entry of data by said accessor, playing a synthesized auditory message over said telephone.

6. A security system as described in claim 5, further comprising:
   an announcement database, wherein upon outputting an instruction to the host computer to grant access, said security computer communicates in said authentication channel the access information to said accessor by selecting and transmitting an access-granted message from said announcement database and sequentially disconnecting from the connection with said telephone prior to use of said access channel.

7. A security system as described in claim 1, wherein said security computer further comprises:
An authentication program mechanism for authenticating access to said host computer;
a biometric analyzer operating in response to instructions from said authentication program mechanism for analyzing a monitored parameter of said accessor; and,
a biometric parameter database addressable by said biometric analyzer for retrieval of a previously registered sample of said accessor, said sample corresponding to the identification of said accessor.

8. A security system as described in claim 7, said biometric analyzer is a voice recognition program for operation within said authentication channel.

9. A security system as described in claim 8, wherein said voice recognition program comprises:
a speech database for retrieval of a speech sample of said accessor corresponding to said login identification;
said security computer adapted to provide instructions to connect and disconnect said security computer to and from said peripheral device;
voice sampling means for instructing said accessor to repeat back and transmit a predetermined auditory statement over said peripheral device;
voice recognition means for authenticating at least one access demands in response to transmission of said predetermined auditory statement; and,
said security computer, upon authenticating a match between the predetermined auditory statement and the transmitted voice data and upon disconnecting from said authentication channel, providing authentication of the accessor and instructing the host computer to grant access along said access channel.

10. A security system as described in claim 7, said biometric analyzer comprises a fingerprint verification program.

11. A security system for granting and denying access to a host computer, said access in response to a demand from an accessor for access to the host computer, said accessor having a cellular telephone for providing communications to the security system, said security system comprising:
a login identification accompanying said demand from said accessor;
an interception mechanism for receiving said login identification, said interception mechanism being in an access channel;
an authentication channel operating independently from said access channel, said authentication channel comprising:
a security computer adapted in an access-channel mode to receive said login identification from said interception mechanism and to communicate access information to said host computer and in an authentication-channel mode to communicate with said cellular telephone;
a subscriber database for retrieval of peripheral addresses corresponding to said login identification;
wherein said security computer is adapted to connect to said associated cellular telephone of said accessor;
a prompt mechanism for instructing said accessor to enter and transmit predetermined data using said cellular telephone;
a comparator for authenticating an access demand in response to receipt of said predetermined data from said cellular telephone;
said security computer, upon verifying a match between said predetermined data and said transmitted data, providing in the access-channel mode instructions to the host computer to grant access thereto along said access channel;
an authentication program mechanism, operating independently from said host computer, for authenticating said accessor demanding access to said host computer;
a biometric analyzer operating in response to said instructions from said authentication program means to analyze a monitored parameter of said accessor; and,
a biometric parameter database addressable by said biometric analyzer for retrieval of a previously registered sample of said accessor, said sample corresponding to the identification of said accessor.

12. A security system as described in claim 11, wherein said security computer further comprises:
an announcement database; and
a voice module capable of selecting a prerecorded auditory message from said announcement database and for prompting the entry of data by said accessor, playing said prerecorded auditory message over said telephone.

13. A security system as described in claim 12, wherein, upon attaining an access-granted condition, said security computer communicates in said authentication channel the access information to said accessor by selecting and transmitting an access-granted message from said announcement database and sequentially disconnecting from the connection with said telephone prior to use of said access channel.

14. A security system as described in claim 11, wherein said authentication channel further comprises:
a voice module capable of synthesizing an auditory message, and, for prompting the entry of data by said accessor, playing a synthesized auditory message over said telephone.

15. A security system as described in claim 11, wherein said biometric analyzer comprises a voice recognition program for operation within said authentication channel to authenticate said accessor.

16. A security system as described in claim 15, wherein said voice recognition program comprises:
a speech database for retrieval of a speech sample of said accessor corresponding to the login identification of said accessor;
said security computer adapted to provide instructions to connect and disconnect said security computer to and from said cellular telephone;
a voice sampling mechanism for instructing said accessor to repeat back and transmit a predetermined auditory statement over said cellular telephone to said security computer;
a voice recognition modules in said security computer for authenticating access demands in response to transmission of said predetermined auditory statement received over said cellular telephone; and,
wherein said security computer, upon authenticating a match between the predetermined auditory statement and the transmitted voice data and upon disconnecting from said authentication channel, providing authentication of said accessor and instructing the host computer to grant access along said access channel.

17. A security system as described in claim 11, wherein said biometric analyzer comprises a fingerprint verification program for operation within said authentication channel to authenticate said accessor.

18. A security system for granting and denying access to a host computer, said access in response to a demand over the internet from an accessor for access to the host computer, said accessor having a personal digital assistant (PDA) for providing communications to the security system, said security system comprising:
   a login identification accompanying said demand over the internet from said accessor;
   an interception mechanism for receiving and verifying said login identification, said interception mechanism in an access channel;
   an authentication channel operating independently from said access channel and, said authentication channel, in turn, comprising;
      a security computer adapted in an access-channel mode to receive said login identification from said interception mechanism and to communicate access information to said host computer and in an authentication-channel mode to communicate with said PDA;
      a subscriber database for retrieval of peripheral addresses corresponding to said login identification;
      said security computer adapted to connect to said PDA;
      a prompt mechanism for instructing said accessor to enter and transmit predetermined data from said PDA;
      a comparator for authenticating access demands in response to transmission of said predetermined data from said PDA;
      said security computer, upon verifying a match between said stored predetermined data and the entered and transmitted data, providing in the access-channel mode instructions to the host computer to grant access thereto along said access channel;
   an authentication program mechanism, operating independently from said host computer, for authenticating an accessor demanding access to said host computer;
   a biometric analyzer operating in response to instructions from said authentication program mechanism to analyze a monitored parameter of said accessor; and,
   a biometric parameter database addressable by said biometric analyzer for retrieval of a previously registered sample of said accessor, said sample corresponding to the identification of said accessor.

19. A security system as described in claim 18, wherein said biometric analyzer comprises a fingerprint verification program for operation within said authentication channel to authenticate the accessor.

20. A security system as described in claim 19, wherein, upon attaining an access-granted condition, said security computer communicates in said authentication channel the access information to said accessor by selecting and transmitting an access-granted message from said announcement database and sequentially disconnecting from the connection with said telephone prior to use of said access channel.

* * * * *

UNITED STATES PATENT AND TRADEMARK OFFICE
CERTIFICATE OF CORRECTION

PATENT NO. : 8,713,701 B2  
APPLICATION NO. : 13/840757  
DATED : April 29, 2014  
INVENTOR(S) : Ram Pemmaraju Page 1 of 1

It is certified that error appears in the above-identified patent and that said Letters Patent is hereby corrected as shown below:

In the Specification:

At column 6, line number 6, change "FIG. 1" to --FIG. 1A--.

Signed and Sealed this
Twentieth Day of October, 2015

Michelle K. Lee
*Director of the United States Patent and Trademark Office*